April 11, 1961  S. J. FINN  2,978,960
FUSE-SETTING MECHANISM
Filed Oct. 12, 1945  15 Sheets-Sheet 1

Inventor
Sidney J. Finn
By his Attorney

April 11, 1961  S. J. FINN  2,978,960
FUSE-SETTING MECHANISM
Filed Oct. 12, 1945  15 Sheets-Sheet 2

Inventor
Sidney J. Finn
By his Attorney

April 11, 1961  S. J. FINN  2,978,960
FUSE-SETTING MECHANISM
Filed Oct. 12, 1945  15 Sheets-Sheet 3

Inventor
Sidney J. Finn
By his Attorney

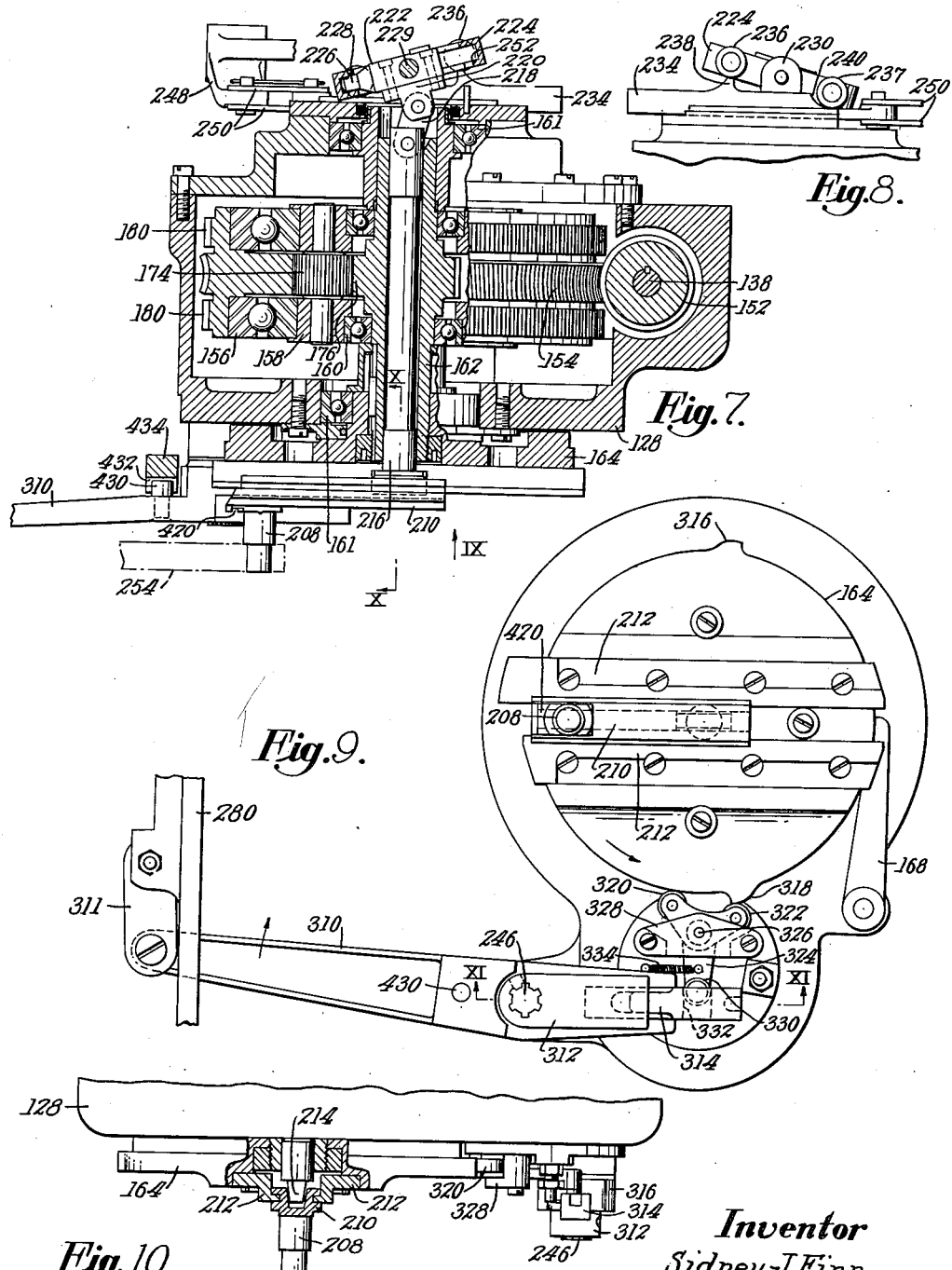

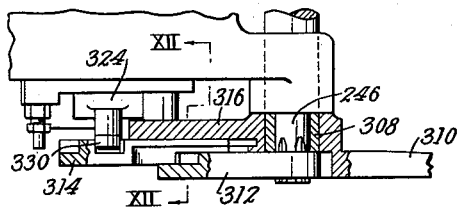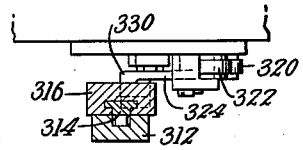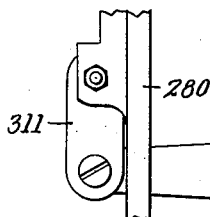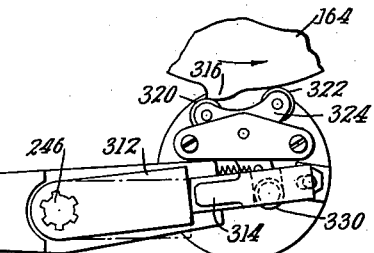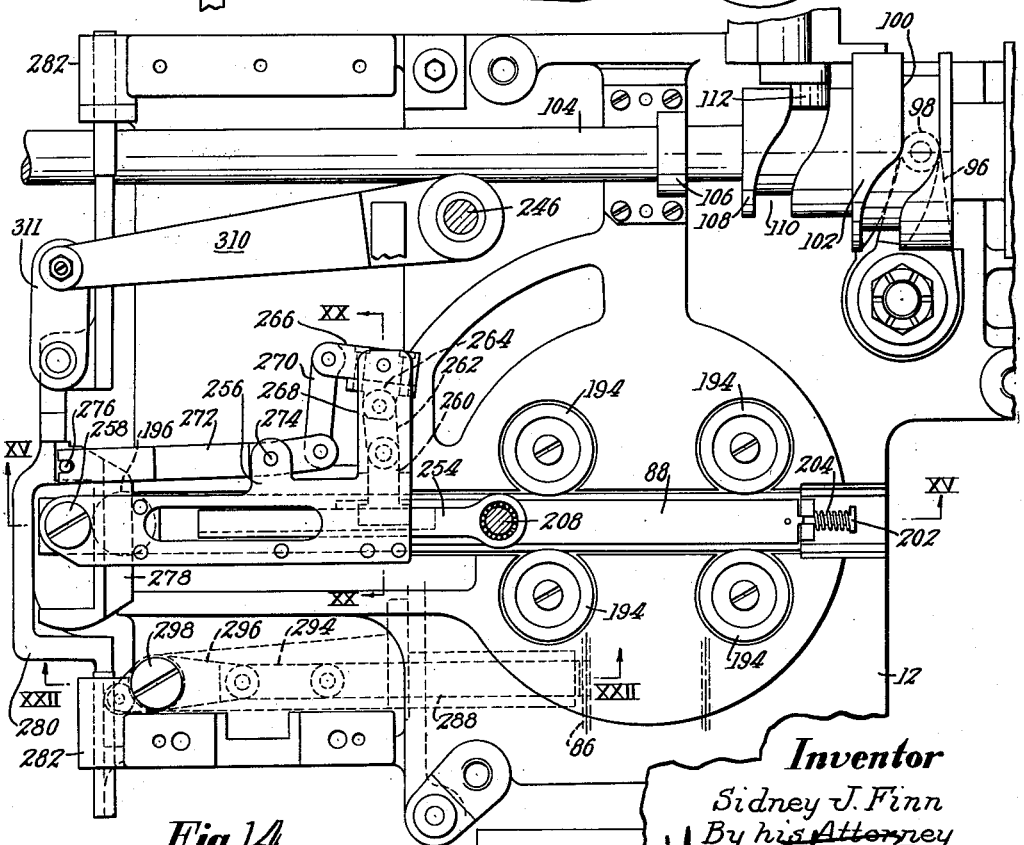

April 11, 1961 S. J. FINN 2,978,960
FUSE-SETTING MECHANISM
Filed Oct. 12, 1945 15 Sheets-Sheet 6

Inventor
Sidney J. Finn
By his Attorney

April 11, 1961 S. J. FINN 2,978,960
FUSE-SETTING MECHANISM
Filed Oct. 12, 1945 15 Sheets-Sheet 7

Inventor
Sidney J. Finn
By his Attorney

April 11, 1961 S. J. FINN 2,978,960
FUSE-SETTING MECHANISM
Filed Oct. 12, 1945 15 Sheets-Sheet 8

Inventor
Sidney J. Finn
By his Attorney

April 11, 1961 S. J. FINN 2,978,960
FUSE-SETTING MECHANISM
Filed Oct. 12, 1945 15 Sheets-Sheet 9
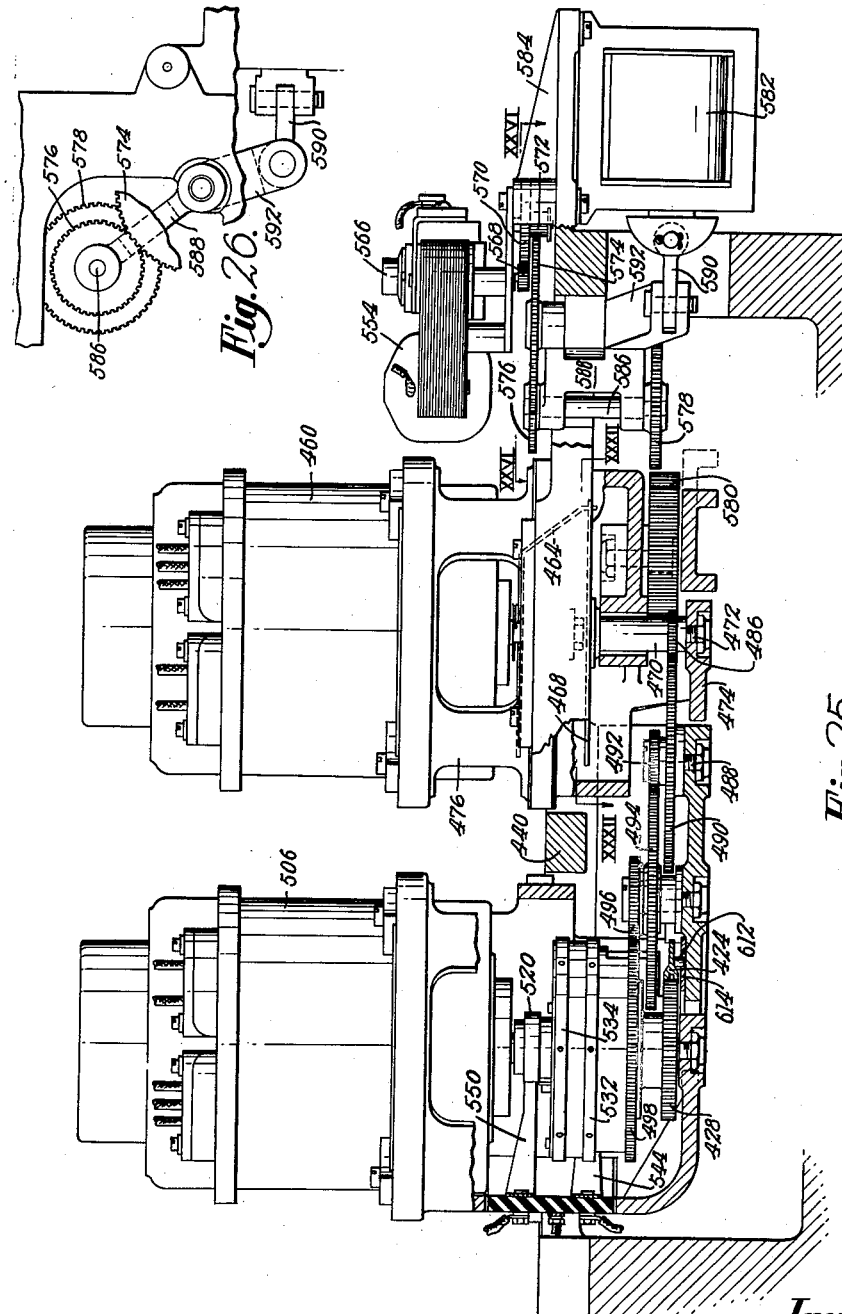
Inventor
Sidney J. Finn
By his Attorney April 11, 1961  S. J. FINN  2,978,960
FUSE-SETTING MECHANISM
Filed Oct. 12, 1945  15 Sheets-Sheet 10

Inventor
Sidney J. Finn
By his Attorney

April 11, 1961 S. J. FINN 2,978,960
FUSE-SETTING MECHANISM
Filed Oct. 12, 1945 15 Sheets-Sheet 11

Inventor
Sidney J. Finn
By his Attorney

Inventor
Sidney J. Finn
By his Attorney

Inventor
Sidney J. Finn
By his Attorney

Inventor
Sidney J. Finn
By his Attorney

April 11, 1961  S. J. FINN  2,978,960
FUSE-SETTING MECHANISM
Filed Oct. 12, 1945  15 Sheets-Sheet 15

Inventor
Sidney J. Finn
By his Attorney

United States Patent Office 2,978,960
Patented Apr. 11, 1961

2,978,960
FUSE-SETTING MECHANISM

Sidney J. Finn, Beverly, Mass., assignor to United Shoe Machinery Corporation, Flemington, N.J., a corporation of New Jersey Filed Oct. 12, 1945, Ser. No. 622,012

33 Claims. (Cl. 89—6)

This invention relates to ordnance and more particularly to mechanisms for automatically setting the fuses of rounds of ammunition. The invention is herein disclosed as embodied in an apparatus which may be associated with a gun-loading mechanism of the type illustrated and described in application for Letters Patent of the United States, Serial No. 655,704, filed March 20, 1946, in my name.

An object of the invention is to provide a fuse-setting mechanism having improved means for operating the fuse-setting elements and for controlling the extent of the fuse-setting operation. To this end and in accordance with a feature of the invention, the fuse-setting mechanism includes a rotatable element having a fuse-ring-engaging member rotatable through a predetermined angle in the fuse-setting operation. This member is rotated by a shaft which is turned through a fixed predetermined angle, this shaft carrying a crank disk on which is adjustably mounted a crank pin having a connection to the fuse-ring-engaging member. A half revolution of the shaft turns the fuse-ring-engaging member to set the fuse and the extent of movement of this member is controlled by varying the position of the crank pin relatively to the crank disk. Variable speed mechanism is employed for operating the shaft carrying the crank disk, this mechanism actuating means for locking the crank pin in adjusted position on the disk at the beginning of the fuse-setting operation and actuating means other means for controlling mechanism by which the fuse setter head is withdrawn from the nose of the round after the shaft has turned one-half revolution at which time it momentarily comes to rest.

Another object of the invention is to provide improved mechanism for positioning the fuse-setting elements with respect to the round prior to the start of a fuse-setting operation. To this end and in accordance with a further feature of the invention, the fuse-setting mechanism includes a carriage carrying a pawl arranged for engagement with a notch in the projectile and a support rotatable in the carriage carrying a pawl engageable with a notch in the fuse ring of the projectile. After the carriage has been moved to carry the pawls into engagement with the nose of the round the support is turned by means which include a slip connection arranged to yield under a load which is less than that required to turn the fuse ring relatively to the round. After the support has been turned to carry the pawl into engagement with the notch in the projectile the entire projectile is rotated by the support until the notch in the projectile engages the pawl carried by the carriage. The load now imposed on the slip connection prevents further movement of the support but other means are provided for positively turning the support during the fuse-setting operation during which time the fuse-ring-engaging member is moved relatively to the projectile in accordance with the setting of the crank pin as described above. A one-way clutch is interposed between the last named means and the support and this last named means is locked in its zero or initial position until the start of the fuse-setting operation.

A further object of the invention is to provide improved means by which the crank pin is adjusted relatively to the crank disk. This is accomplished, in accordance with another feature of the invention, by the use of a self-synchronous motor directly connected by reduction gearing to a slide by which the crank pin is carried, whereupon the slide is moved in accordance with the operation of a transmitter motor or director electrically connected to the self-synchronous motor. Inasmuch as the armature of this motor turns many times by reason of the reduction gearing in order to move the crank pin between its extreme positions, a second self-synchronous motor is provided to insure that the proper phase relationship between the crank-pin-adjusting mechanism and the transmitter will be maintained at all times. This second self-synchronous motor controls electric circuits which are completed if the proper phase relationship is not maintained, energizing an electric motor, operation of which operates the adjusting mechanism until the proper phase relationship has been re-established. The control for this motor includes means for reversing its direction of rotation in the event that it rotates in the wrong direction in attempting to re-establish the proper phase relationship.

The above and other features of the invention, including various novel combinations of parts and details of construction, will now be described by reference to accompanying drawings and pointed out in the claims.

Figure 1:
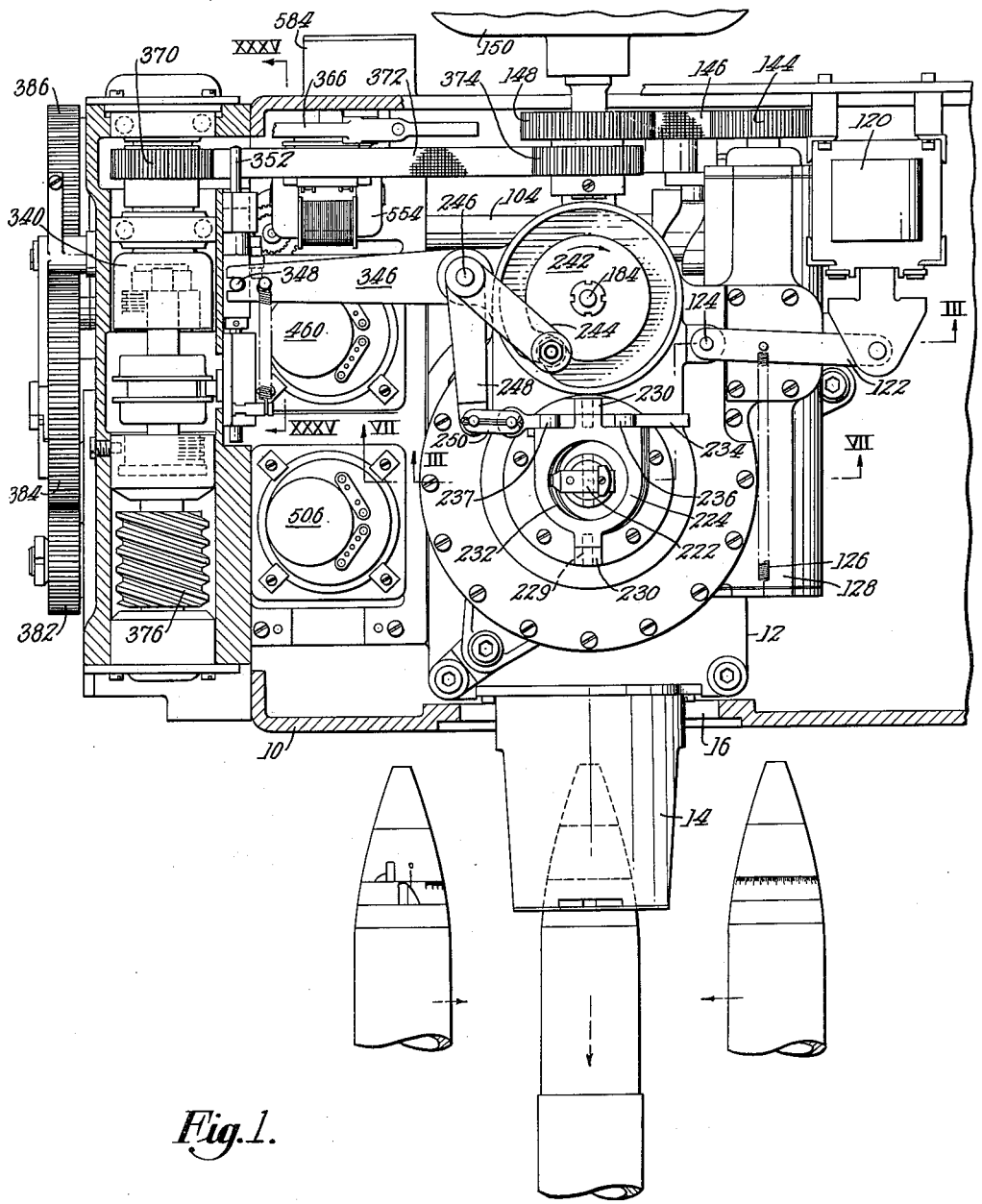
Fig. 1 is a plan view partly in section of one form of apparatus in which the invention is embodied.
Figure 2:
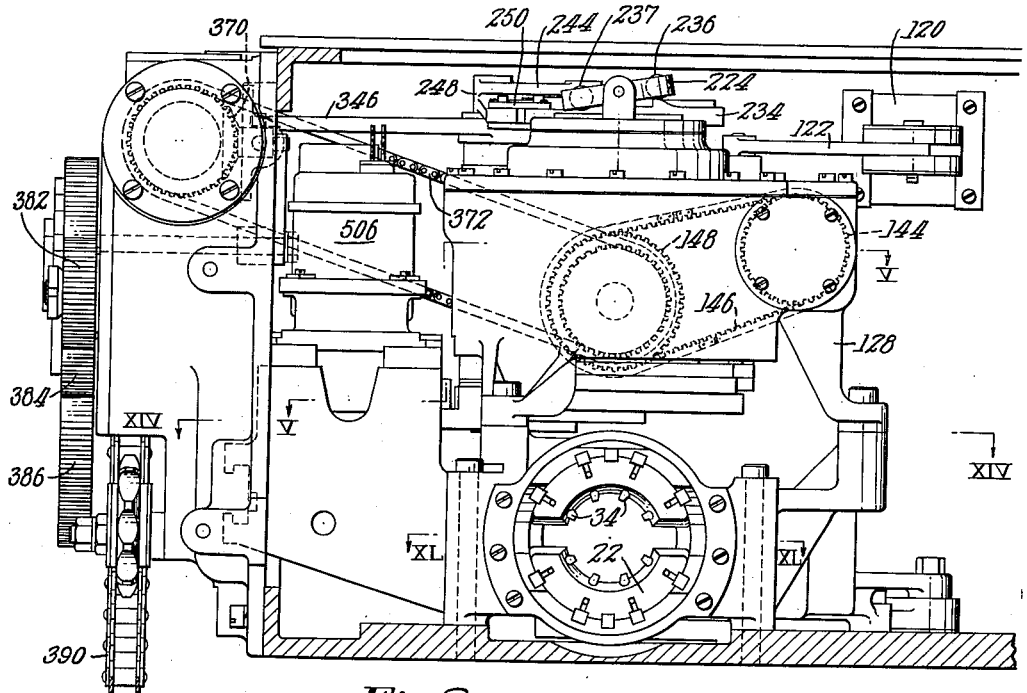
Fig. 2 is a front elevation of the fuse-setting mechanism.
Figure 3:
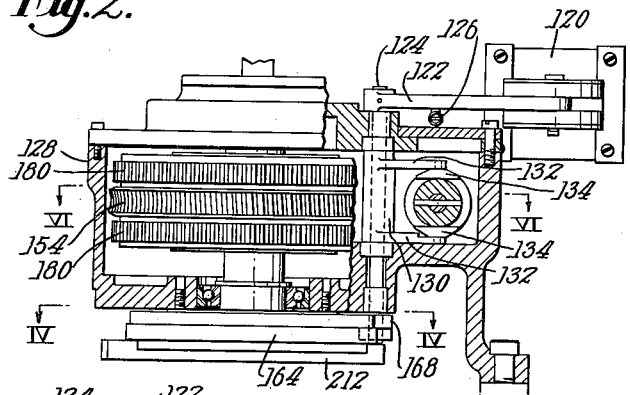
Figure 4:
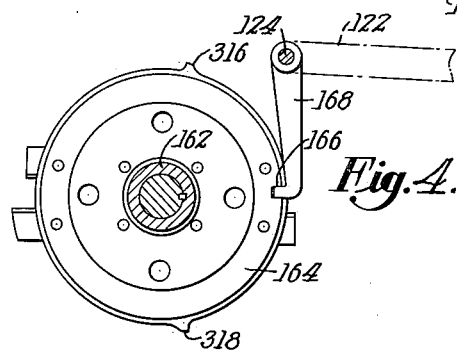
Figure 5:
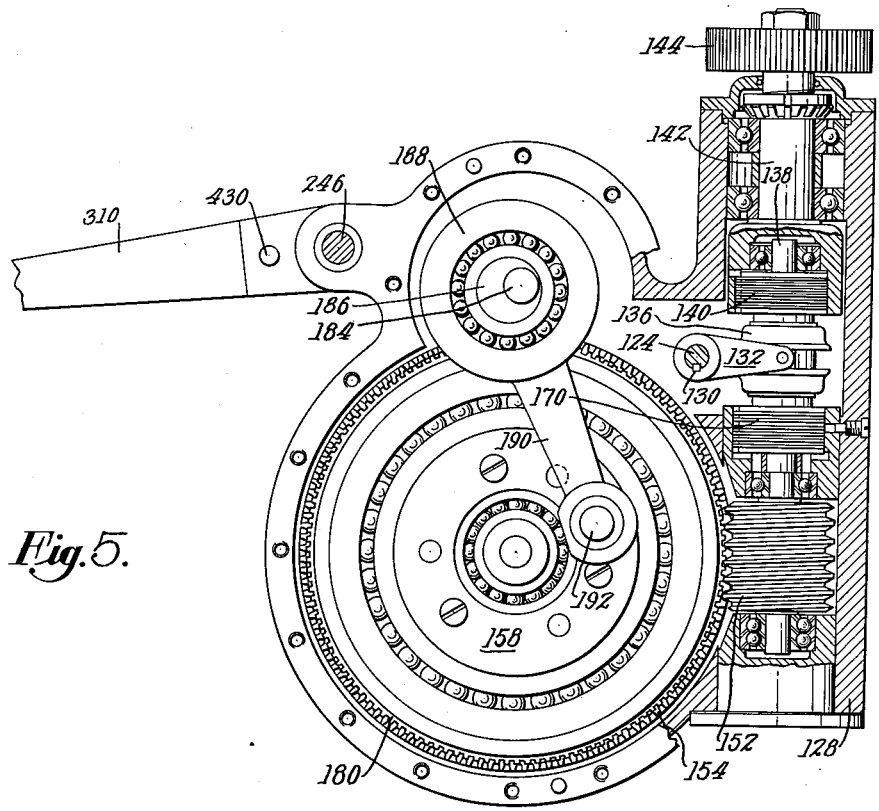
Figure 6:
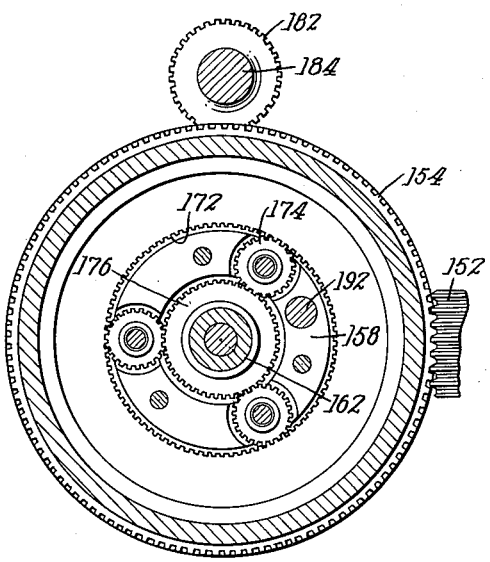
Figure 15:
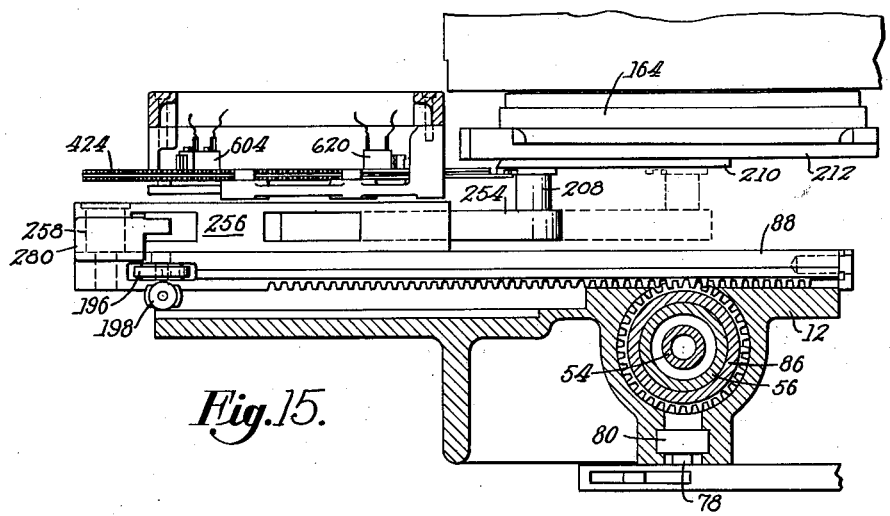
Figures 16, 17, 18:
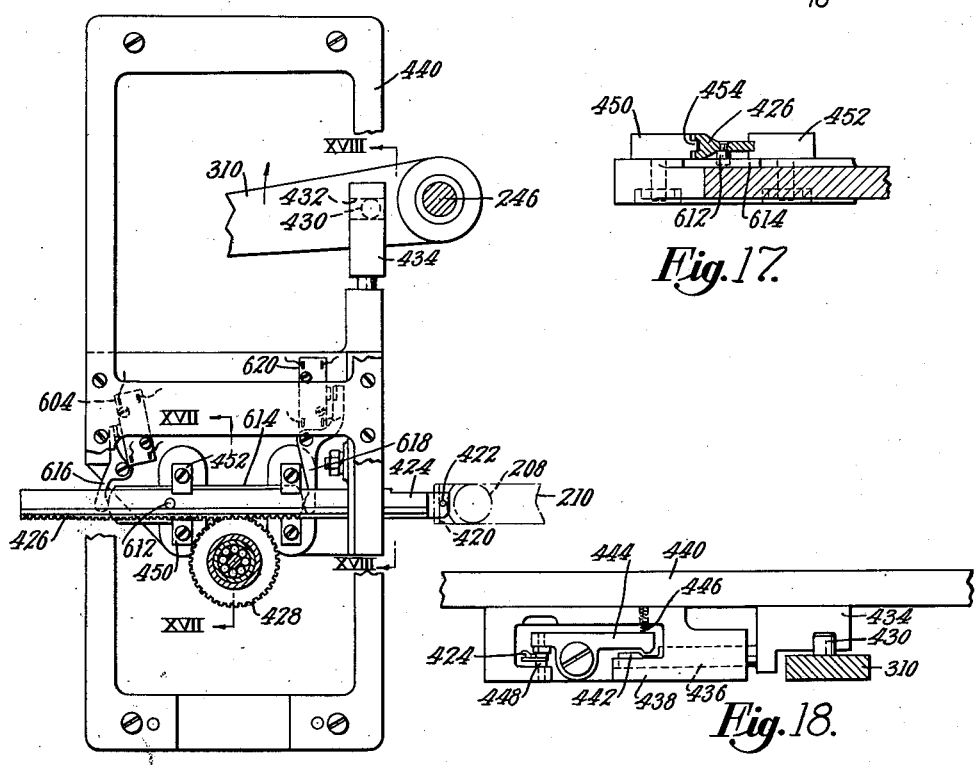
Figure 19:
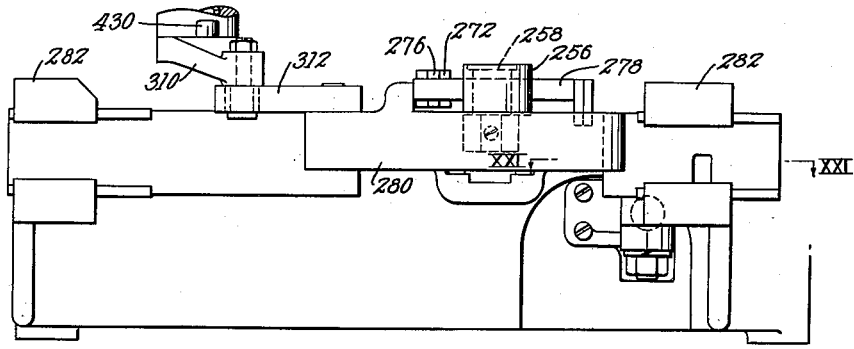
Figure 20:
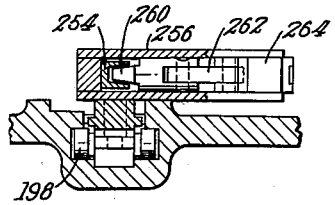
Figure 21:
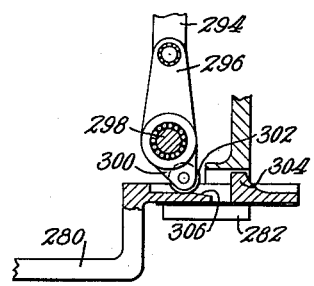
Figure 22:
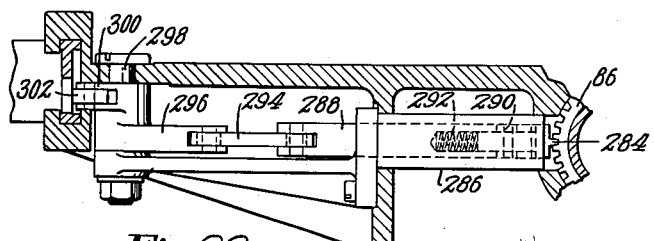
Figure 23:
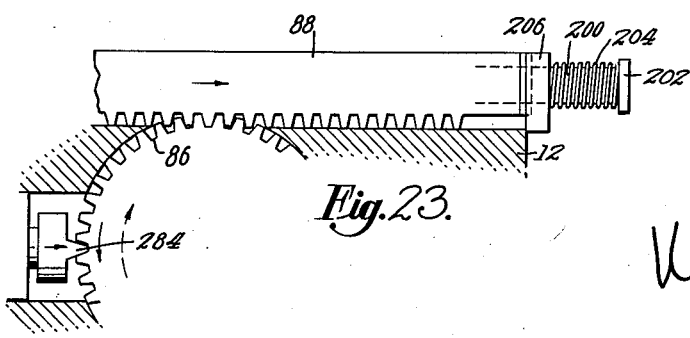
Figure 24:
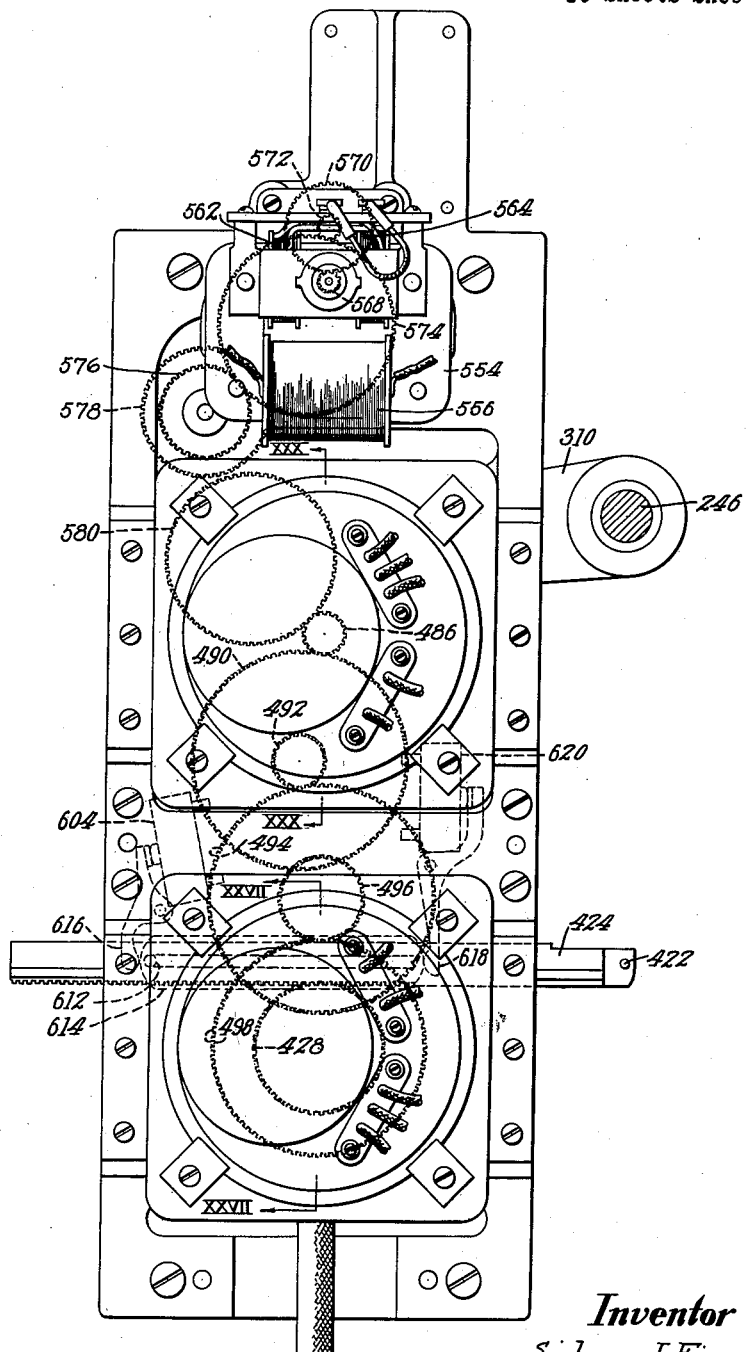
Figure 27:
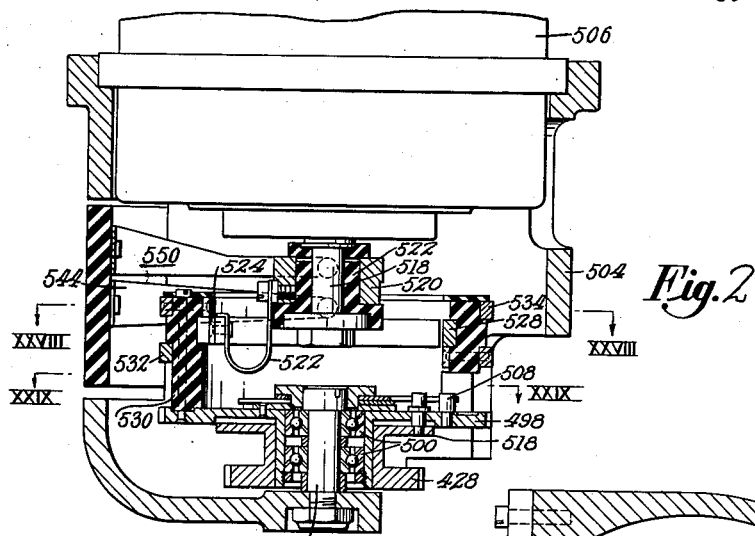
Figure 28:
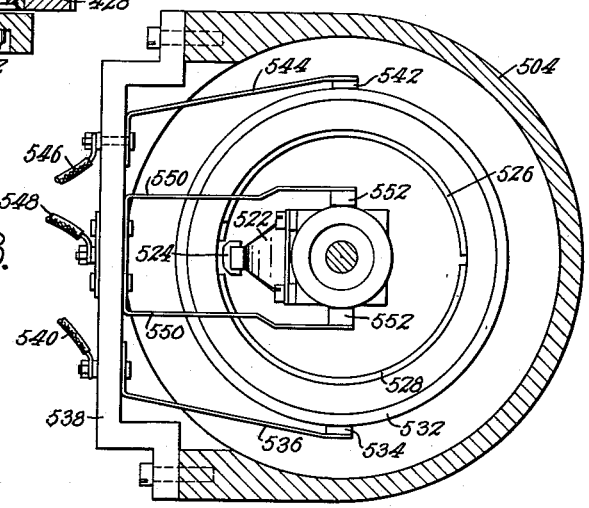
Figure 29:
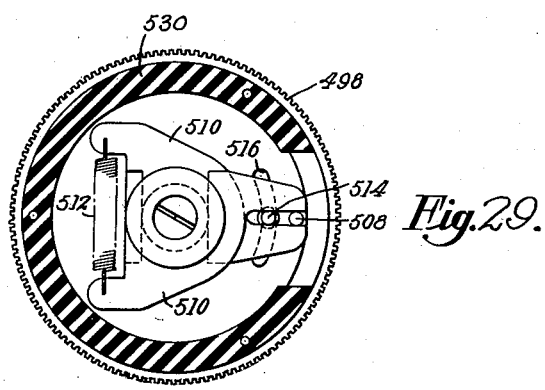
Figure 30:
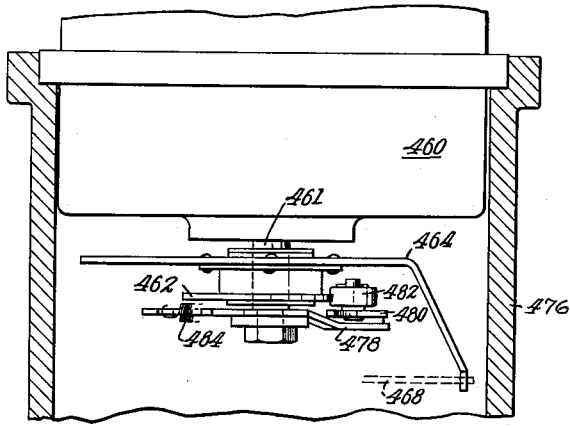
Figure 32:
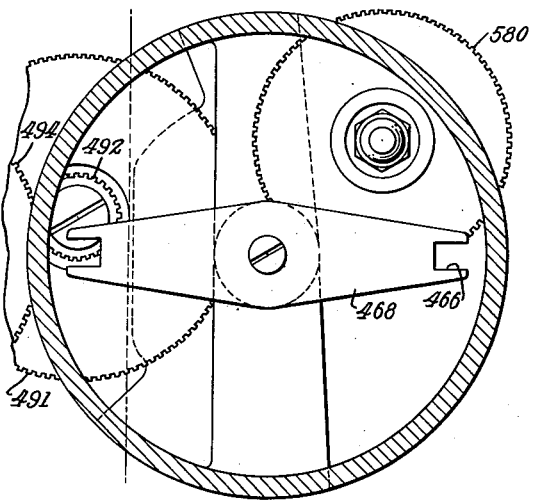
Figure 31:
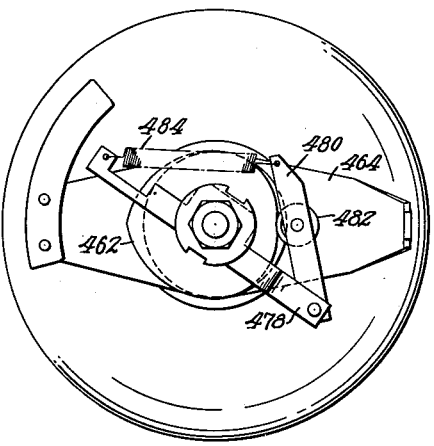
Figure 33:
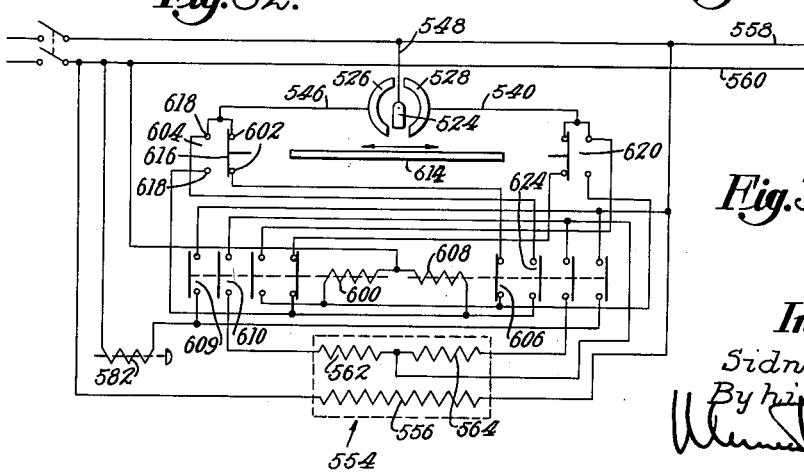
Figure 34:
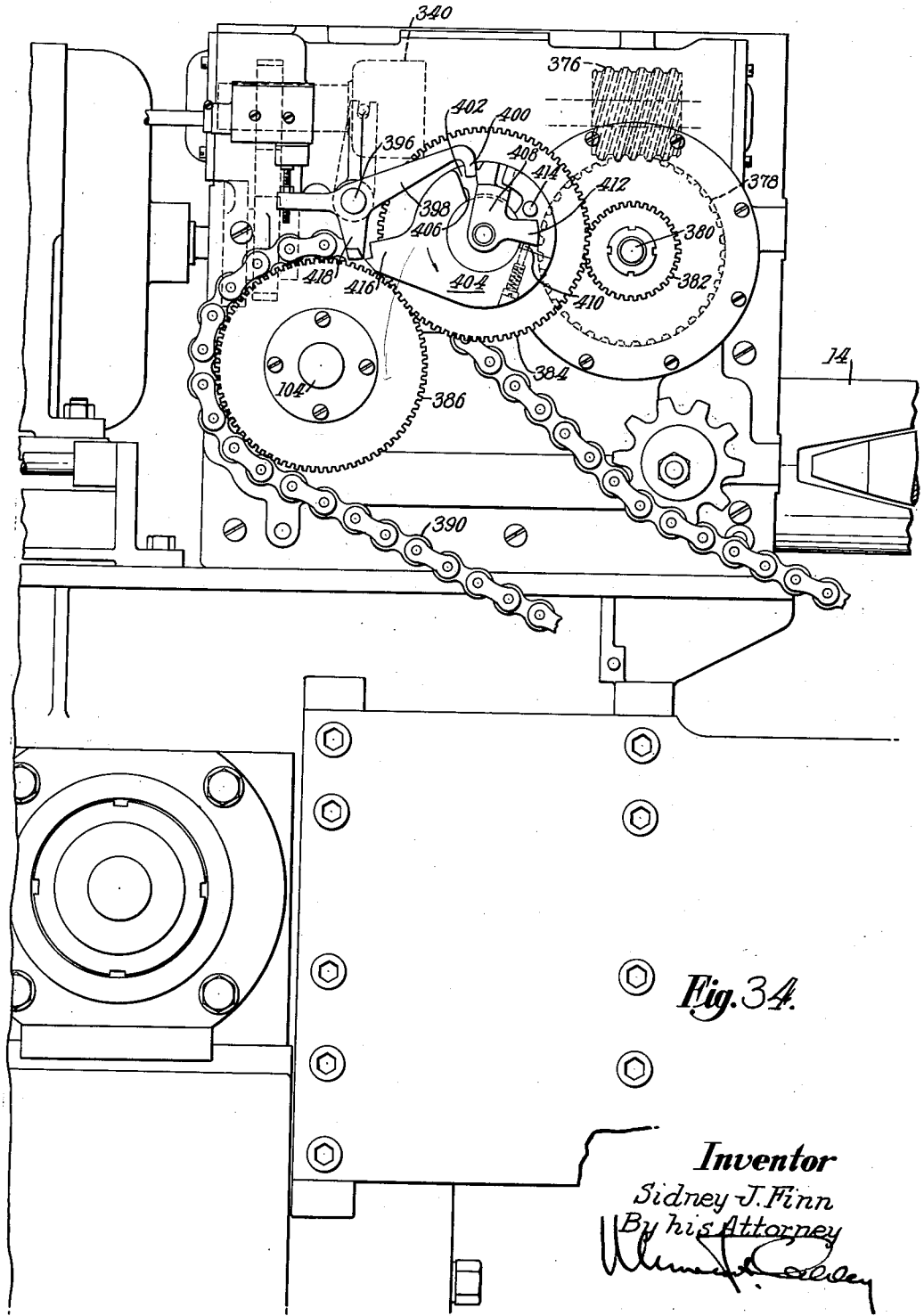
Figure 35:
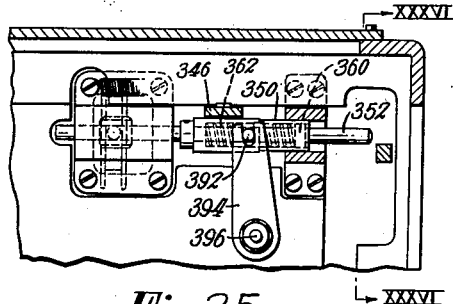
Figure 36:
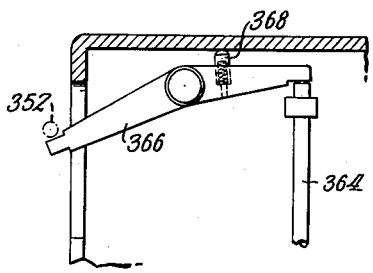
Figure 37:
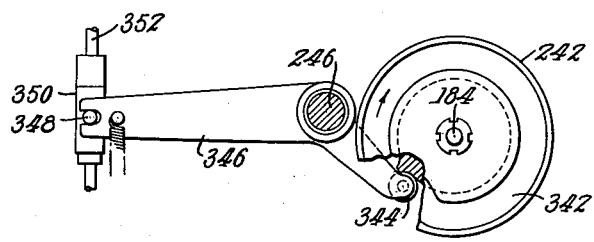
Figure 38:
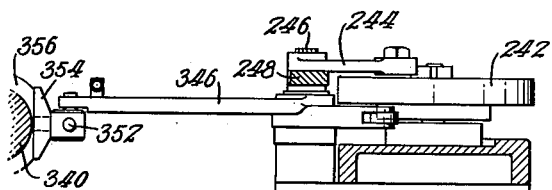
Figure 39:
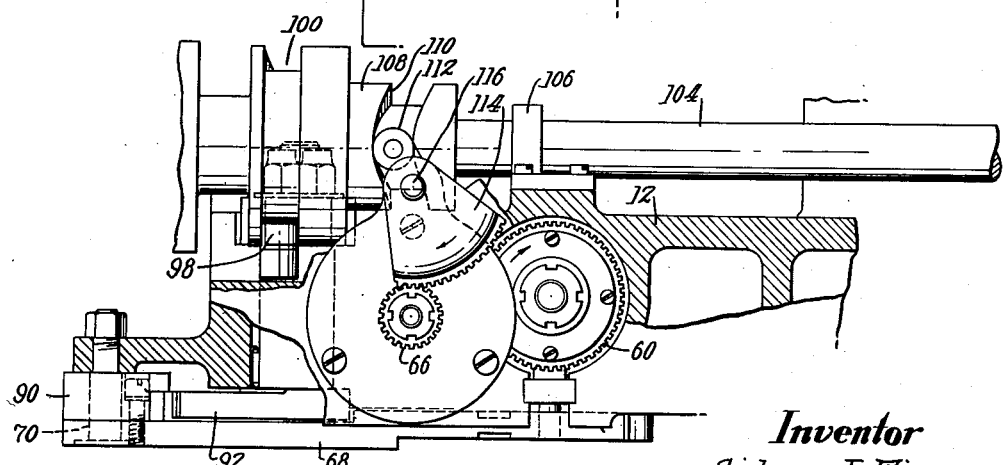
Figures 40, 41, 41A:
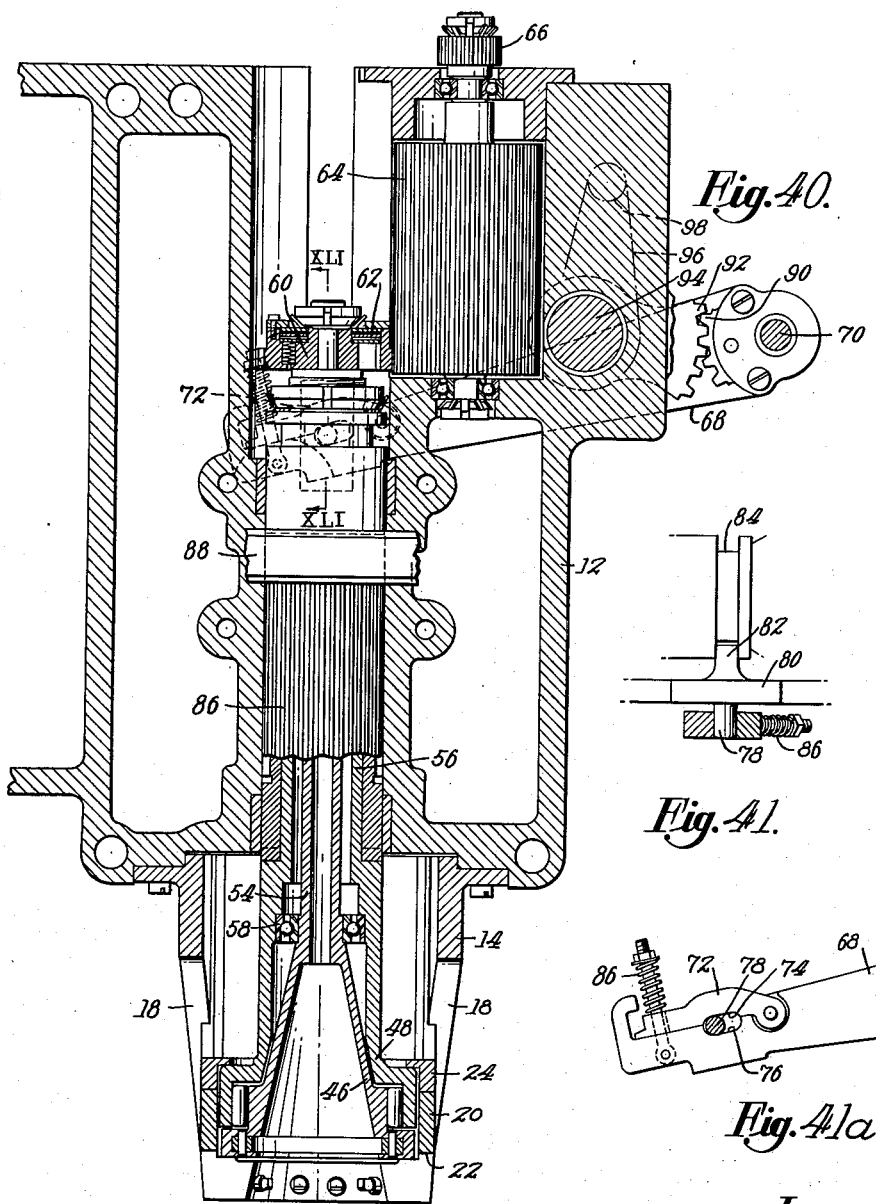
Figure 42:
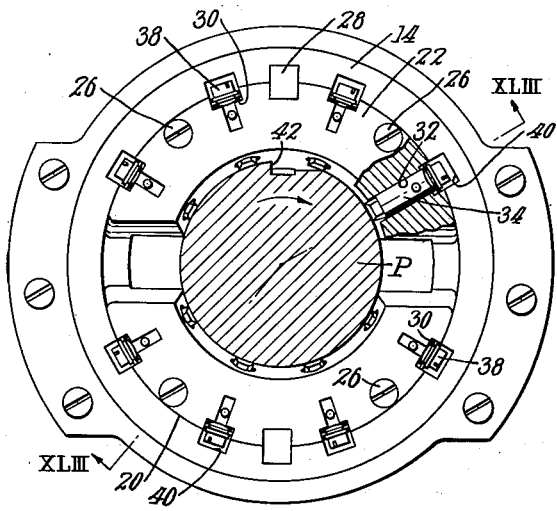
Figure 43:
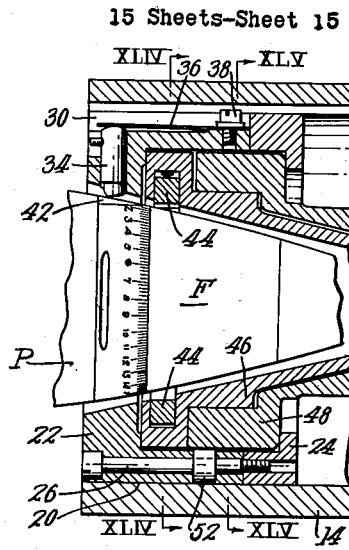
Figure 44:
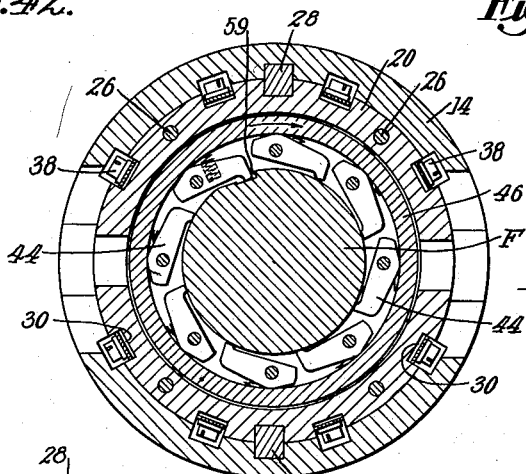

Fig. 3 is a section on the line III—III of Fig. 1;
Fig. 4 is a section on the line IV—IV of Fig. 3;
Fig. 5 is a section on the line V—V of Fig. 2;
Fig. 6 is a section on the line VI—VI of Fig. 3;
Fig. 7 is a section on the line VII—VII of Fig. 1;
Fig. 8 is a rear elevation of the mechanism shown at the top of Fig. 7;
Fig. 9 is a bottom plan view of the mechanism shown in Fig. 7;
Fig. 10 is a section on the line X—X of Fig. 7;
Fig. 11 is a section on the line XI—XI of Fig. 9;
Fig. 12 is a section on the line XII—XII of Fig. 11;
Fig. 13 is a view of a portion of the mechanism shown in Fig. 9 with the parts in different positions;
Fig. 14 is a section on the line XIV—XIV of Fig. 2;
Fig. 15 is a section on the line XV—XV of Fig. 14;
Fig. 16 is a plan view of a portion of the mechanism by which the crank pin is adjusted to vary the amount of fuse setting;
Fig. 17 is a section on the line XVII—XVII of Fig. 16;
Fig. 18 is a section on the line XVIII—XVIII of Fig. 16;
Fig. 19 is a side elevation of the mechanism shown in Fig. 14 looking from the left;
Fig. 20 is a section on the line XX—XX of Fig. 14;
Fig. 21 is a section on the line XXI—XXI of Fig. 19;
Fig. 22 is a section on the line XXII—XXII of Fig. 14;
Fig. 23 is a vertical section of a portion of the mechanism for turning the fuse-ring-engaging member showing the means by which lost motion between the parts is prevented at the beginning of the fuse-setting operation;
Fig. 24 is a plan view illustrating the gearing which enables adjustment of the crank pin by a self-synchronous motor and showing mechanism for restoring the proper phase relationship between the parts and transmitting mechanism by which operation of the motor is controlled;

Fig. 25 is a side elevation partly in section of the mechanism shown in Fig. 24;

Fig. 26 is a view along the line XXVI—XXVI of Fig. 25;

Fig. 27 is a section on the line XXVII—XXVII of Fig. 24;

Fig. 28 is a section on the line XXVIII—XXVIII of Fig. 27;

Fig. 29 is a section on the line XXIX—XXIX of Fig. 27;

Fig. 30 is a section on the line XXX—XXX of Fig. 24;

Fig. 31 is a bottom plan view of the mechanism shown in Fig. 30;

Fig. 32 is a section on the line XXXII—XXXII of Fig. 25;

Fig. 33 is a wiring diagram illustrating the operation of the mechanism for restoring the proper phase relationship of the parts;

Fig. 34 is a side elevation of the mechanism shown in Fig. 1 looking from the left;

Fig. 35 is a section on the line XXXV—XXXV of Fig. 1;

Fig. 36 is a section on the line XXXVI—XXXVI of Fig. 35;

Fig. 37 is a plan view partly in section of a clutch operating cam and arm;

Fig. 38 is a side elevation partly in section of the parts shown in Fig. 37;

Fig. 39 is an elevation partly in section of a portion of the mechanism by which the fuse-setting elements are initially positioned on the nose of a round;

Fig. 40 is a section on the line XL—XL of Fig. 2;

Fig. 41 is a section on the line XLI—XLI of Fig. 40;

Fig. 41a is a side elevation of the mechanism shown in Fig. 41;

Fig. 42 is a front elevation partly in section of the fuse-setter head;

Fig. 43 is a section on the line XLIII—XLIII of Fig. 42;

Fig. 44 is a section on the line XLIV—XLIV of Fig. 43, and

Figure 45:
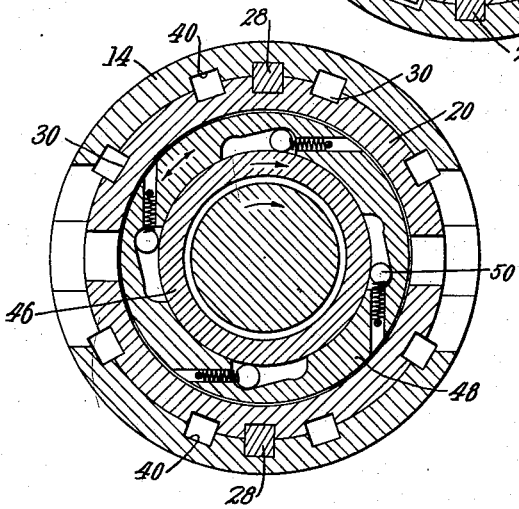

Fig. 45 is a section on the line XLV—XLV of Fig. 43.

The fuse-setting apparatus is mounted in a casing 10 (Fig. 1) in which is carried a gear housing 12 to the rearward portion of which is secured a support 14 for the fuse-setting elements, this support projecting from the casing 10 through an opening 16 therein. As noted in Fig. 40, the support 14 is provided with openings 18 at opposite sides thereof to permit movement of rounds alternately from the right and left into fuse-setting position as shown in Fig. 1 with the nose of the round within the support 14 for engagement by the fuse-setting elements. The rounds are moved into fuse-setting position by any suitable mechanism. One form of mechanism which may be employed for this purpose is shown in my aforementioned copending application.

The fuse-setter head will now be described by reference to Figs. 40 to 45 inclusive. Carried by the support 14 for rectilinear sliding movement is an annular carriage 20 formed of a pair of rings 22, 24 secured together by screws 26. This carriage is guided for rectilinear movement in the support 14 by keys 28 cooperating with ways formed in the support and carriage. The ring 22 is provided with lengthwise grooves 30 spaced about the periphery thereof and radial bores 32 provide communication between the grooves 30 and the interior of the ring 22. Slidably carried within each bore 32 is a pawl 34 urged inwardly by a leaf spring 36 (Fig. 43) extending lengthwise within the adjacent groove 30 and secured by a screw 38 in the forward end of the groove. For accommodating the heads of the screws 38 during the sliding movement of the carriage 20 the support 14 is provided with grooves 40. The inner ends of the pawls rest on the projectile P rearwardly of the fuse ring F in position for one of them to engage a reference notch 42 after the carriage has been moved rearwardly to the position shown in Fig. 43 and the round rotated in the direction of the arrow shown in Fig. 42. The pawls thus constitute means for locking the round against rotation during the fuse-setting operation.

The turning of the fuse ring is accomplished by one of a group of pawls 44 (Fig. 44) spring pressed inwardly into engagement with the fuse ring of the projectile and pivoted in an annular groove formed in a rotatable support 46. This support is arranged to be turned during the fuse-setting operation by a hollow drive member 48 having a one-way drive connection to the support comprising spring pressed rolls 50 received in recesses in the drive member 48 and engageable with the periphery of the support 46. The rearward ends of the support and drive member are received between internal flanges on the rings 22 and 24 as shown in Fig. 43 and the screws 26 are provided with roller bearings 52 providing an antifriction support for the drive member 48.

The support 46 is generally conical at its rearward portion to receive the nose of a round as shown in Figs. 40 and 43 and has a hollow shank portion 54 concentric with a hollow shank portion 56 of the drive member 48 and spaced therefrom. Ball bearings 58 provide an antifriction support between the support 46 and the drive member 48.

Prior to the setting of the fuse and after a round has been introduced into the support 14 the support 46 is rotated in the direction of the arrow in Fig. 44 until one of the pawls 44 engages the setting notch 59 in the fuse ring of the round. The support 46 continues its movement rotating the round with it as shown by the arrow in Fig. 45 until the reference notch 42 engages one of the pawls 34 in the carriage 20. For thus rotating the support 46 it is provided at its forward end (Fig. 40) with a gear 60 connected thereto by a plurality of friction disks 62, the gear 60 meshing with a gear 64 of sufficient length to accommodate movement of the gear 60 during forward and rearward movement of the carriage 20 and with it the support 46 and the drive member 48. The gear 64 is journaled in the gear housing 12 and is provided at its forward portion with a pinion 66 rotated in a manner to be described.

For moving the fuse-setting elements rearwardly of the support 14 into the positions shown in Fig. 40 an arm 68 is provided, carried for rocking movement on a shaft 70. To the outer end of this arm is pivoted a short arm 72 (Fig. 41a) having a recess 74 cooperating with a recess 76 in the arm 68 to accommodate a pin 78 in a lever 80 (Fig. 41) which in turn has a pin 82 received by an annular groove 84 in the forward end of the drive member 48. The short arm 72 is yieldingly held by a spring 86 in position to engage the pin 78 but this arm can yield after the fuse-setting elements have moved rearwardly into engagement with the nose of the round, upon continued movement of the arm 68 in a counterclockwise direction, thereby accommodating projectiles of different shapes. The friction disks 62 permit the gear 60 to move with respect to the support 46 after the notches in the round and the fuse ring have been engaged by the respective pawls, the gear 60 slipping under a light load so that no relative movement takes place between the fuse ring and the round during turning of the support 46. During the actual setting of the fuse, the drive member 48 is turned in a clockwise direction as indicated by the arrow in Fig. 45 imparting through the rolls 50, a positive drive to the support 46 and turning the fuse ring with respect to the round which is held by the pawls 34 against rotation at this time. The shank portion 56 of the drive member 48 is provided with a pinion 86 engageable by a rack 88 operated by mechanism to be described to turn the fuse ring of the round any desired amount.

For operating the arm 68 to move the fuse-setting elements into engagement with the nose of the round the lower end of the arm is provided with a gear segment 90 arranged to be driven by a segment 92 carried by a shaft 94 journaled in the lower wall of the gear housing 12. Secured to the shaft 94 is an arm 96 the outer end of which carries a roll 98 (Fig. 14) received in a groove 100 of a cam 102. This cam is carried by a shaft 104 journaled in brackets 106 (Figs. 14 and 39), secured to the gear housing 12. The cam shaft 104 also carries a cam 108 having a groove 110 receiving a roll 112 connected to a gear segment 114 (Fig. 39) pivoted at 116 and meshing with the gear 66 by which the support 46 is turned to position the fuse-setting elements properly with respect to the round.

The fuse-setting operation is initiated by energizing a solenoid 120 (Fig. 1). When the fuse-setting operation is started the fuse-setter head is in operative position on the nose of a round, this movement of the fuse-setter head taking place at the conclusion of the previous fuse-setting operation. The armature of the solenoid 120 is connected by a link 122 to a rockshaft 124 (Figs. 3 and 5) whereupon this shaft is turned in a counterclockwise direction as viewed in Fig. 5 against the action of a spring 126 connected between the link 122 and a pin carried in the wall of a gear housing 128. The shaft 124 carries a clutch shipper member 130 having a pair of arms 132 provided with members 134 (Fig. 3) received in a groove in the periphery of a clutch element 136 splined on a shaft 138 journaled in the gear housing 128. Upon energization of the solenoid 120 a plurality of clutch plates 140 are pressed together by the movement of the element 136 to connect the shaft 138 with a drive shaft 142 carrying a pinion 144 connected by a chain 146 (Fig. 1) to a pinion 148 on the shaft of a constantly driven motor 150.

The shaft 138 (Fig. 5) carries a worm 152 which meshes with a worm gear 154 rotatably carried by bearings 156 (Fig. 7) which are in turn supported by a cage 158 which is journaled by bearings 160 on a hollow vertical shaft 162. This shaft is journaled by bearings 161 in the gear housing 128 and has secured to its lower end a disk 164 (Figs. 4 and 7) having in its periphery a recess 166 to receive a laterally projecting ear on the end of an arm 168 which is carried by the lower end of the rockshaft 124. Thus it will be seen that when the solenoid 120 is energized to rock the shaft 124 the arm 168 is withdrawn from locking engagement with the disk 164 whereupon the hollow shaft 162 is driven in a manner to be described, until it has completed one revolution whereupon the end of the arm 168 snaps into the recess 166 in the disk 164 by the action of the spring 126 (Fig. 1) thereby moving the clutch member 136 downward as viewed in Fig. 5, disconnecting the shaft 138 from the drive shaft 142 and squeezing a plurality of brake disks 170 together immediately to stop operation of the worm 152.

The worm gear 154 is provided with internal teeth 172 (Fig. 6) engageable with planetary gears 174 journaled in the cage 158, these gears also meshing with a gear 176 formed on the hollow shaft 162. The cage 158 is arranged to be oscillated during operation of the worm gear 154 so as to cause the shaft 162 to be driven from the worm gear at varying speeds, the arrangement being such that the hollow shaft 162 starts to move slowly then accelerates rapidly to a maximum speed and then decelerates back again to a zero speed in a manner similar in principle to that shown and described in the James Patent No. 2,309,595, dated January 26, 1943. Integral with the worm gear 154 and arranged above and below it are spur gears 180 (Fig. 7) with which engage gears 182, one of which is illustrated in Fig. 6, carried by a shaft 184. Secured to this shaft is an eccentric 186 (Fig. 5) on which is journaled an eccentric strap 188 connected by an arm 190 and a pin 192 to the cage 158. The gear ratios are such that for one-half revolution of the worm gear 154 the shaft 162 rotates one revolution and the shaft 184 rotates two revolutions. Accordingly, the shaft 162 operates through the variable speed cycle above described during each half revolution thereof or each revolution of the shaft 184, the purpose for which will appear as the description proceeds.

The operation of the rack 88 (Figs. 14, 15, 23 and 40) by which the fuse setter head is turned in the fuse-setting operation, will now be described. The rack is slidable in a way formed in the top of the gear housing 12 as shown in Fig. 14 and is guided in its movements by rolls 194 engageable with opposite sides of the rack. The rack carries at its left end, as viewed in Figs. 14 and 15, a guide roll 196 which engages opposite sides of the way in which the rack slides. A roll 198, journaled in the outer end of the guideway, supports the outer end of the rack. The rack is shown in its initial position in Figs. 14, 15 and 23 or, in other words, the position it assumes before the fuse-setting operation starts. In order that the fuse be set with the utmost accuracy the rack is held against the teeth of the gear 86 by which the fuse setter is driven so that there is no lost motion of the rack when it starts to move, due to clearance between the teeth of the rack and the gear. For this purpose the rack carries a forwardly extending pin 200 (Fig. 23) having a head 202 forming an abutment for a compression spring 204 surrounding the pin, the other end of the spring engaging a collar 206 slidable on the pin and engaging a wall of the gear housing 12 when the rack is in its initial position. The spring is compressed somewhat when the rack is in its initial position and tends to move the rack 88 toward the right so that the forward surfaces of the teeth engage the adjacent surfaces of the teeth of the gear 86 and no lost motion occurs between the rack and the gear during the turning of the fuse setter head to set the fuse of a round.

The rack 88 is operated by a crank pin 208 (Figs. 8, 9, 10 and 14) which is carried by the disk 164 for adjustment radially thereof to vary the extent of movement of the rack 88 during the rotation of the disk thereby to vary the amount by which the fuse is set. The crank pin 208 depends from a slide 210 having channels in its sides in which are received plates 212 secured to the under surface of the disk 164. The slide is thus movable along the plates 212 thereby to vary the distance between the crank pin 208 and the center of the disk. The mechanism by which the crank pin is adjusted will be described later. After the crank pin has been properly adjusted in accordance with the desired amount of fuse setting, the slide 210 is locked to the plates 212 by a wedge 214 received in a groove formed in the upper surface of the slide 210. This wedge is carried by the lower end of a shaft 216 (Fig. 7) concentric with the hollow shaft 162 and splined thereto for rotation therewith. The upper end of the shaft 216 is connected by a link 218 to a depending bracket 220 carried by a rocker 222. The link 218 and the bracket 220 form a pair of toggle links which are straightened when the rocker 222 is moved into a horizontal position thereby to move the shaft 216 downwardly whereupon the wedge 214 forces the slide 210 tightly against the plates 212 thus effecting a rigid connection between the crank pin 208 and the disk 164.

The rocker 222 is moved into a horizontal position by a rocker frame 224 (Figs. 1 and 7) having a central aperture, in the periphery of which is formed an internal groove 226 to receive a reduced extension or follower 228 of the rocker 222. The rocker frame 224 is journaled for rocking movement on pins 229 carried by brackets 230 (Figs. 1 and 8) which extend upwardly from the top of the gear housing 128. For operating the rocker frame 224 a cam plate 234 is slidably carried by the top of the gear housing 128 and cooperates with a pair of rolls 236 and 237 (Fig. 8) carried by the rocker frame at opposite sides of its pivot. With the cam plate 234 in the position shown in Fig. 8 the rocker frame is held in the position illustrated by a projection 238 engaging the roll 236. However, when the plate is moved toward the right as viewed in Fig. 8, the projection 238 passes from under the roll 236 and a cam surface 240 acts on the roll 237 to tilt the frame 224 into a horizontal position. The cam plate 234 is operated from the shaft 184 by a cam 242 (Fig. 1) carried thereby. This cam has a cam groove in which rides a follower on the end of an arm 244 secured to a vertical rockshaft 246. This rockshaft carries an arm 248 connected by links 250 to the cam plate 234.

As stated previously the shaft 184 makes two complete revolutions for one revolution of the shaft 162 (Fig. 7) forming one complete cycle of the apparatus. In order that the slide 210 carrying the crank pin 208 remain locked to the disk 164 (Figs. 7 and 10) during the complete cycle, provision is made for preventing tilting of the rocker 222 by the tilting of the rocker frame when the cam 242 completes one revolution, since to so move the rocker would release the crank pin from locking engagement with the disk by which it is carried. Accordingly the rocker frame 224 has a slot 252 in the lower wall of the groove 226 spaced 180° from the position of the follower 228 of the rocker when the parts are at rest. Accordingly when the rocker frame 224, at the conclusion of one revolution of the shaft 184, is moved back to its original position by the movement of the cam plate 234, the slot 252 being in register with the follower 228 of the rocker permits the rocker frame to move relatively thereto. Accordingly the toggle links remain straight until the end of the cycle is reached whereupon the parts return to the positions shown in Fig. 7 and the crank pin is released so that it may be adjusted relatively to its supporting disk for the next fuse-setting operation.

The crank pin 208 is pivotally connected to an arm 254 (Figs. 14 and 15) which, for the greater portion of its length, is U-shaped in cross section as shown in Fig. 20 and this arm is slidable in a housing 256 secured by a pin 258 to the outer end of the rack 88. During adjustment of the crank pin 208 the arm 254 is free to slide in the housing 256. However, when the crank pin is locked by the mechanism described above the arm 254 is locked to the housing 256. For this purpose a wedge 260 forces the arm 254 into engagement with the adjacent wall of the housing, this wedge being connected by a link 262 to an arm 264 of a bell crank lever 266 (Fig. 14) pivoted in a lateral projection 268 of the housing 256. The link 262 and the portion 264 of the bell crank lever form toggle links which when straightened force the wedge 260 into locking position. The bell crank lever 266 is connected by a link 270 to a lever 272 pivoted at 274 to the housing 256, its other end being connected by a pin-and-slot connection 276 to a U-shaped arm 278 slidable transversely of the housing 256 in the outer end thereof. The member 278 is moved to force the wedge 260 into engagement with the arm 254 at the same time that the crank pin 208 is locked to its driving member. The member 278 is moved by a bar 280 slidable in brackets 282 in the side of the gear housing 12, the bar having a generally U-shaped portion in which the member 278 is located when the parts are at rest as shown in Fig. 14. Upon movement of the bar upwardly as viewed in Fig. 14, the member 278 is moved with it to straighten the toggle links 262, 264.

The bar 280 is also utilized to withdraw a locking member 284 (Fig. 22) from engagement with the gear 86 when the fuse-setting operation is started. The locking member 284 is slidable in a sleeve 286 and is moved by a plunger 288 into locking engagement with the gear, there being a pin-and-slot connection 290 between the plunger and the locking member so that the plunger may move relatively to the locking member when the latter is moved into engagement with the gear, thereby to prevent strain on the parts. A spring 292 is interposed between the locking member and the plunger so that the locking member is normally maintained at its outermost position in the plunger. The rear end of the plunger is connected by a link 294 to a lever 296 journaled on a pin 298. The lever 296 has an arm 300 (Fig. 21) carrying a roll 302 engageable with a face of the bar 280. This bar has a projection 304 arranged to engage the roll 302 upon movement of the bar to the left as viewed in Fig. 21, whereupon the lever is moved in a clockwise direction as viewed in Fig. 14, thereby to withdraw the locking member 284 from engagement with the gear 86. Upon movement of the bar 280 to the right, as viewed in Fig. 21, at the conclusion of a fuse-setting operation, the roll 302 rides onto a cam surface 306 of the bar 280 whereupon the parts are moved into the positions shown in Figs. 14 and 22 and the locking member 284 engages the gear 86 thereby effectively to lock the gear 86 and the rack 88 in their initial positions.

As pointed out heretofore the shaft 184 is driven two revolutions during each cycle of operation thereby causing two oscillations of the shaft 246. It is necessary, however, that the locking member 284 remain out of engagement with the gear 86 and for the arm 254 to remain locked to the housing 256 until the end of the cycle and for this reason the bar 280 should not be returned to the position shown in Fig. 14 until the end of the cycle. Accordingly the bar is connected to the shaft 246 in the manner described below.

Journaled on a sleeve 308 surrounding the shaft 246 (Fig. 11) is an arm 310, the end of which is connected by a link 311 (Fig. 13) to the bar 280. The arm 310 is connected to the shaft 246 by an arm 312 secured to the lower end of the shaft in which arm is carried a slide 314 also received in a way in the adjacent end 316 of the arm 310. With the parts in the positions shown in Figs. 9 and 11, the arm 312 is connected by the slide 314 to the arm 310 so that the arm 310 will move when the shaft 246 is turned. This shaft is operated by the cam 242 as described above. This cam starts to rotate upon energization of the solenoid 120 (Fig. 1) and at the beginning of the rotation the shaft 246 is rocked to move the bar 280 thereby to release the locking member 284 and to lock the arm 254 to the rack 88. At the same time the pin 208 is locked to the disk 164. The shaft 184 (Fig. 1) carrying the cam 242 by which the shaft 246 is oscillated rotates at a constant speed and returns to the position shown in Fig. 1 when the cycle of operation is half completed or, in other words, when the shaft 162 (Fig. 7) completes a half revolution. Because of the variable speed drive of the mechanism shown in Fig. 7, and described above, the shaft 162 comes to rest momentarily whereas the shaft 184, which is driven from the gears 180, continues to rotate.

The disk 164 carries a pair of cam members 316, 318 (Fig. 9) arranged to engage rolls 320, 322 carried by a lever 324 pivoted at 326 in a bracket 328. The outer end of the lever carries a roll 330 received in a groove 332 in the slide 314. When the lever 324 is rocked in a counterclockwise direction as viewed in Fig. 9 the slide 314 is withdrawn thereby from engagement with the arm 312 carried by the shaft 246 so that when this shaft oscillates no movement is imparted to the arm 310. The lever is moved in a counterclockwise direction by the cam member 316 of the disk 164 upon engagement of this member with the roll 320 thereby moving the lever against the action of a spring 334. This action takes place when the disk 164 has completed a half revolution so that no motion is imparted to the arm 310 and the bar 280 by movement of the shaft 246. At the beginning of the last half of the cycle of operation of the apparatus, the member 316 engages the roll 322 thereby moving the parts back into the positions shown in Fig. 9 and the next operation of the parts by the return of the member 318 takes place before the cycle of operations has been completed so that the arm 310 is connected to the shaft 246 when the shaft is again operated at the conclusion of the cycle of operation. It will be noted in Fig. 9 that the cam members 316, 318 are not spaced 180° apart so that the cam member is in engagement with the roll 322 at the beginning and the end of the cycle of operations, whereas the member 316 is in engagement with the roll 320 when the cycle is half completed at which time shaft 246 is oscillated, so that, during this oscillation of the shaft, no movement is imparted thereby to the bar 280.

At the completion of one revolution of the shaft 184 carrying the cam 242, at which time the fuse has been set, a clutch 340 (Fig. 1) is engaged to initiate the operation of mechanism for transferring the round into alinement with the bore of the gun and for ramming it into the breech end of the gun. The cam 242, in its under side, has a cam track 342 (Fig. 37) which receives a follower 344 on the end of a lever 346 journalled on the shaft 246. The outer end of the lever has a pin-and-slot connection 348 to a sleeve 350 slidable on a pin 352 (Fig. 35) which carries a clutch-actuating member 354 (Fig. 38) received in a peripheral groove 356 of the clutch 340. The pin 352 carries a collar 360, forming an abutment for one end of a spring 362, the other end of which bears against shoulders formed in an end of the sleeve 350 thereby to form a yielding connection between the sleeve and the pin 352. The purpose of this is to permit movement of the sleeve by the cam 242 without engaging the clutch in the event that conditions are such as to make it inadvisable to operate the clutch.

An example of one such condition is in the event that the gun is not in its battery position. Referring to Fig. 36 a rod 364 is operated by the gun and moves downwardly when the gun fires thereby to permit clockwise movement of a stop arm 366 under the influence of a spring-pressed plunger 368 so that the left end of the arm moves into alinement with the pin 352 until the gun returns to battery whereupon the parts assume the positions shown in Fig. 36. In the event, however, that the gun fails to return to battery the left end of the arm 366 remains in alinement with the pin 352 thereby preventing movement of the pin by movement of the sleeve 350 so that the clutch remains out of engagement.

The driving portion of the clutch member 340 is connected by a pinion 370 (Fig. 1) and a chain 372 to a drive gear 374 on the shaft of the constantly running motor 150. Upon engagement of the clutch a worm 376 is rotated and this worm engages a worm gear 378 (Fig. 34) carried by a shaft 380 on which is also mounted a pinion 382 which meshes with a pinion 384 driving a gear 386 carried by the cam shaft 104. The cam shaft 104 carries a sprocket (not shown) which operates a sprocket chain 390 the function of which is to operate mechanism which carries the round into alinement with the bore of the gun and rams it into the gun. Inasmuch as this mechanism forms no part of the invention claimed herein it is not illustrated in this application but is fully illustrated and described in the copending application referred to above.

Provision is made for holding the clutch 340 in engagement until the completion of the loading operation and until another round has been moved as illustrated and described in the aforementioned application into the fuse-setting position. For this purpose the sleeve 350 carries a pin 392 (Fig. 35) in driving engagement with the outer end of an arm 394 extending upwardly from a shaft 396 which shaft also carries an arm 398 (Fig. 34) the outer end of which is provided with a projection 400 received in a recess 402 of a member 404 carried by the shaft on which the gear 384 is mounted. The recess 402 is formed between a radially extending wall 406 and a member 408 pivoted on the shaft and movable relatively to the member 404. When the clutch is engaged the arm 398 is moved upwardly whereupon the member 408 is rocked in a counterclockwise direction by a spring-pressed plunger 410 to a position determined by the engagement of an arm 412 with a pin 414 on the member 404. The portion 400 of the arm 398 now rides on the periphery of the members 404 and 408 until the member 404 completes a revolution, at which time the clutch 340 is disengaged. A projection 416 of the member 404 engages an extension 418 of the arm 398 thereby to move the arm in a clockwise direction camming the member 408 back to the position shown in Fig. 34, disengaging the clutch and positively stopping the parts in the positions shown.

The mechanism for adjusting the crank pin 208 (Fig. 15), in order to vary the amount of fuse setting, will now be described. The slide 210 (Figs. 7 and 9) by which the crank pin is carried for movement toward and from the center of the disk 164 is provided in its under surface outwardly of the crank pin with a groove 420 arranged when the parts are in the positions shown to receive a pin 422 (Fig. 16) carried by the adjacent end of a rack bar 424. This rack bar is provided with rack teeth 426 arranged to be operated by a pinion 428 thereby to move the rack bar rectilinearly to move the slide 210 and effect the adjustment of the crank pin. After the crank pin has been properly adjusted and the fuse-setting operation is initiated by energization of the solenoid 120 (Fig. 1) the slide 210 is moved out of engagement with the pin 422 in the adjacent end of the rack bar until the disk 164, by which the slide is carried, returns to its initial position. It is important during this time that no movement be imparted to the rack bar 424 as otherwise the pin 422 carried thereby would not be in position to be received by the slot in the slide 210. Accordingly, the rack bar 424 is locked against movement at the same time that the slide 210 is locked to the disk 164. The arm 310 (Figs. 9 and 16) which is moved in the direction of the arrow at the beginning of the fuse-setting operation carries a pin 430 projecting upwardly therefrom and received by a slot 432 in a slide 434 (Fig. 18) provided with a shank portion 436 in a bracket 438 secured to a portion of a support 440 by which the adjusting mechanism for varying the fuse-setting time is carried. A cam surface 442 is formed in the outer end of the shank portion 436 of the slide 434 and acts upon the adjacent end of a lever 444 urged into the position shown in Fig. 18 by a spring 446. However, upon movement of the slide 434 by the arm 310 toward the right at the beginning of the fuse-setting operation the lever 444 is rocked in a counterclockwise direction thereby to clamp the adjacent portion of the rack bar 424 which lies between the lever and a supporting member 448 carried by the bracket 438. Accordingly, the rack bar is clamped thereby against movement until the completion of the fuse-setting operation when the arm 310 is returned to the position illustrated and the rack is relieved of the force exerted thereon by the lever 444.

The rack bar is mounted for sliding movement between supporting members 450 and 452 (Figs. 16 and 17). The members 450 are provided with tongues 454 received within a groove extending lengthwise of the rack bar 424 through the teeth thereof. The opposite surface of the rack bar is supported in a groove in the adjacent portion of the supporting member 452.

For thus moving the rack bar 424 to adjust the fuse-setting time, a self-synchronous motor 460 (Fig. 25) carried by the support 440 is provided. This motor forms a receiving motor of a self-synchronous transmission system which also includes a self-synchronous transmitter motor (not shown) similar to the motor 460 and electrically connected thereto in a manner well known in the art so that upon movement of the armature of the transmitter motor the armature of the receiver motor 460 moves a corresponding amount. Motors of this type develop very litle torque and consequently the motor 460 is connected by reduction gearing to the rack 424 so that sufficient power is developed for moving the rack bar and the crank pin 208.

Journaled on the armature shaft 461 of the motor 460 is a heart-shaped cam 462 (Figs. 30 and 31) carrying an arm 464 having a downwardly projecting end received in a recess 466 (Fig. 32) in an arm 468 secured to the upper end of a sleeve 420 (Fig. 25) journaled on a pin 472 in a bracket 474 carried by a downwardly extending portion of a mounting 476 in which the motor 460 is carried. The heart-shaped cam is driven by the motor 460 through a strain release connection thus permitting relative movement between the armature shaft and the heart-shaped cam should the load on the motor for any reason exceed its capacity. This connection includes a bar 478 (Fig. 31) secured to the armature shaft and pivotally connected at one end to an arm 480 carrying a cam roll 482 held in engagement with the periphery of the cam 462 by a spring 484 connected between the outer end of the arm 480 and to an end of the bar 478. The arrangement is such that the cam roll 482 tends to remain in the depression of the heart-shaped cam 462 and as the armature of the motor turns the heart-shaped cam is driven by the cam roll 482 as it revolves around the axis of the armature.

Carried by the sleeve 470 (Fig. 25) is a gear 486 connected by reduction gearing 490, 492, 494, 496 to a gear 498 which as shown in Fig. 27 is journaled on ball bearings 500 carried by a pin 502 in the bottom wall of a support 504 for a second self-synchronous motor 506.

The motor 506 is electrically connected to a similar motor (not shown) in the transmitter. The two motors in the transmitter are connected by reduction gearing having the same ratio as that between the motor 460 and the gear 498. For a maximum setting of the fuse time the transmitter motor corresponding to the motor 506 will be turned by the operator or by suitable mechanism not over one revolution, whereas the other transmitter motor may rotate fifty revolutions more or less depending upon the gear ratio between the two motors. The motor 506 is provided for insuring that the receiving and transmitting motors and the rack 424 will remain in the proper phase relationship at all times as will be explained later.

In order to permit movement of the gear 498 by the motor 460 during a fuse-setting operation should the transmitter motor be adjusted at this time, at which time the rack bar 426 is locked against movement as previously described, the following connections are provided between the gear 498 and the pinion 428 which is in engagement with the rack bar 424. As shown in Figs. 27 and 29 the gear 498 carries an upwardly projecting pin 508 which is received between the adjacent end portions of a pair of crossed arms 510 arranged like a pair of scissors, the opposite ends of which are interconnected by a tension spring 512. Also received between the ends of the arms 510 adjacent to the pin 508 is a pin 514 which passes through a slot 516 in the gear 498 and is carried by a flange 518 integral with the pinion 428. From the above it will be understood that if the motor 460 is operated during the fuse-setting operation at which time the rack 424 is locked against movement, the pin 508 will move one of the arms 510 relatively to the other and to the pinion 428. However, at the end of the fusesetting operation when the rack is released for movement to adjust the crank pin the arm 510 which has been prevented from movement heretofore is now moved by the spring 512 to move the pin 514 until it engages the other arm 510 thereby operating the pinion 428 and the rack 424 in accordance with the previous movement of the motor 460 which may take place during the previous fuse-setting operation particularly in the event that the target is in motion.

The motor 506 includes an armature shaft 518 on which is mounted a collar 520 separated from the shaft by a sleeve 522 of suitable electrical insulating material. The collar 520 carries a contact arm 522 which has a contact member 524 normally located between adjacent ends of a pair of curved conductors 526, 528 mounted in a circular support 530 of insulating material carried by the top of the gear 498 for movement therewith. The conductor 528 is connected electrically to a collector ring 532 on the exterior of the support 530 and the conductor 526 is similarly connected to a collector ring 534 on the exterior of the support 530 and spaced above the ring 532. In engagement with the collector ring 532 is a contact member 534 on the end of a conductor arm 536 mounted on a bracket 538 of insulating material which is secured to the support 504, the arm 536 being connected to a wire 540. Similarly the other collector ring 534 is connected by a contact 542 and arm 544 to a wire 546. A wire 548 is connected by a pair of arms 550 and contacts 552 to the collar 520 carrying the contact arm 522.

In the operation of the motor 460 to adjust the position of the crank pin 208 for varying the amount of fuse setting, the contact member 524, movable by the motor 506, will normally stay in the position shown in Fig. 28 relatively to the conductors 526 and 528 since these conductors are movable by the gear 498 and this relationship between the contact member 524 and the conductors 526, 528 is indicative of the proper phase relationship between the receiving motors and transmitting motors. If the transmitting motors are moved when the power between them and the receiving motors is cut off the motor 460 will move into phase relationship with its transmitter motor when the power is re-established. However, due to the fact that the armature of motor 460 rotates a great many times in adjusting the rack 424 between its extreme positions the armatures of the motor 460 and the transmitter motor can be in the proper phase relationship whereas the rack 426 may not be in the position corresponding to the position of the directing mechanism. Should this happen, the contact member 524 will engage one of the conductors 526, 528.

For moving the rack 424 into its proper position a resetting motor 554 (Figs. 24 and 25) is provided, this being illustrated as a clock type motor having a winding 556 which is always connected to a pair of power lines 558, 560 as shown in Fig. 33. The motor also includes a pair of windings 562, 564 between which is mounted a rotor 566 arranged for rotation in one direction or the other in response to connecting the ends of one or the other of the windings 562, 564. The rotor 566 carries at its lower end a pinion 568 engageable with a gear 570 which is in turn connected by reduction gearing 572, 574, 576 to a gear 578 arranged to be moved into and out of engagement with a gear 580 meshing with the gear 486 (Fig. 25).

For moving the gear 578 into and out of engagement with the gear 580 a solenoid 582 is mounted on the under side of a bracket 584 by which the motor 554 is also carried. The gears 576, 578 are carried by a shaft 586 journaled in an arm 588 mounted for swinging movement about the axis of the gear 574 so that the pinion 576 always remains in engagement with the gear 574 and the gear 578 is movable into and out of engagement with the gear 580. The armature of the solenoid 582 is connected by a link 590 to an arm 592 integral with the arm 588, the arrangement being such that upon energization of the solenoid the gear 578 moves into engagement with the gear 580, whereupon operation of the motor 554 acts through the train of gears to operate the rack 424. During this operation, the armature of the motor 460 being stationary the gear 486 turns with respect to the armature by reason of the connections shown in Fig. 31 and described heretofore. Upon de-energization of the solenoid 582 the armature moves outwardly under the influence of a spring (not shown) to disconnect the gears 578 and 580.

Assume now that the receiving motors are out of the proper phase relationship with the sending motors and that the contact member 524 carried by the armature of the motor 506 is in engagement with the conductor 526. As shown by the wiring diagram (Fig. 33), this causes the energizatoin of a relay coil 600 through a circuit which includes contacts 602 of a switch 604 and contacts 606 of a relay including a relay coil 608. The energization of the relay coil 600 closes a circuit through the solenoid 582 through contacts 609 and also causes the ends of coil 562 of the motor 554 to be connected through contacts 610. Thus the motor 554 is connected to the rack through the train of gearing and the rotor turns in a direction to move the conductor 526 out of engagement with the contact member 524 so that the rack is in a position corresponding to the position of the armature of the motor 506. Should the contact member 524 of the motor 506 be in engagement with the conductor 528 the relay coil 608 is energized thus connecting the ends of the coil 564 of motor 554 causing rotation of the rotor in the opposite direction until the rack is in its proper position.

It may happen that the rack is so much out of phase with the motor 506 that the adjustment thereof will be in the wrong direction. In other words if the relative movement between the contact member 524 and the conductor rings 526, 528 exceeds a half revolution the same relationship will exist between the contact member and the conductor rings as would occur in the event that the relative movement had been in the other direction for less than a half revolution. Thus it may happen that the rack will be adjusted in precisely the opposite direction from what it should be. For this purpose provision is made for causing a reversal in the rotation of the motor 554 should the rack 426 be moved to a predetermined position indicating an error in its direction of movement. For this purpose the rack carries a depending pin 612 which is received by a slot in a slidable bar 614 the ends of which are in engagement with arms 616 and 618 of the switch 604 and a switch 620 respectively. Assuming now that the rack 424 is moving to the left when it should move toward the right, eventually the pin 612 engages the end of the slot in the bar 614 causing the bar to actuate the arm 616 of the switch 604 opening the contacts 602 (Fig. 33) and closing a circuit through contacts 618. The circuit through the relay coil 600, which was heretofore described, is now interrupted and a circuit is established through the relay coil 608 it being assumed at this time that the conductor 526 is engaged by the contact member 524. The energization of the relay coil closes a circuit through the winding 564 of the motor 554 whereupon the motor rotates in the opposite direction to move the rack 424 to the right. At the beginning of this movement the arm 616 of the switch 604 returns to the position shown in Fig. 33. The circuit through the contacts 606 is opened by the energization of the relay coil 608 so that the relay coil 600 cannot again be energized. A holding circuit through the coil 608 is completed through contacts 624 so that this coil remains energized until the proper phase relationship of the rack with the motor 506 is attained. As soon as the rack reaches the proper position the conductor 526 moves out of engagement with the contact member 524 and the relay coil 608 is de-energized, opening the circuit through the solenoid 582. Thus it will be seen that regardless of the extent to which the sending and receiving motors may be put out of phase during periods when the power between the motors is off, the proper phase relationship between the motors and position of the rack 424 are automatically restored upon a restoration of the power.

*Operation*

The cycle of operations of the fuse-setting mechanism ends with a new round in position for a subsequent fuse-setting operation as shown in Figs. 1 and 43 with the pawls 34 and 44 in engagement with the notches 42 and 59 respectively in the nose of the round. At this time the crank pin 208 (Figs. 7 and 10) is free to be adjusted radially of the disk 164. This crank pin is adjusted into the proper position in accordance with the desired fuse-setting time by the self-synchronous motor 460 as described above, and when the gun is to be fired a switch is closed energizing the solenoid 120 (Fig. 1).

The energizing of this solenoid engages the clutch elements 140 (Fig. 5) whereupon the shaft 138 is driven from the motor 150 (Fig. 1) and the worm gear 154 is rotated. The gears 180 immediately start the cam shaft 184 (Figs. 1 and 6) rotating, causing the rocker frame 224 to be moved by the camp late 234 (Figs. 7 and 8) into horizontal position, straightening the toggle links 218, 220, forcing the wedge 214 (Fig. 10) downwardly thereby to lock the slide 210 carrying the crank pin 208 in its adjusted position relatively to the disk 164. The operation of the cam 242 by the cam shaft 184 also causes movement of the bar 280 (Fig. 14) in a direction to straighten the toggle links 262, 264 thereby to lock the arm 254 connected to the crank pin to the housing 256 which is in turn secured to the rack 88 by which the fuse setter head is turned. At the same time the locking member 284 (Fig. 22) is withdrawn from engagement with the gear 86 carried by the drive member 48 (Fig. 40) by the mechanism shown in Figs. 21 and 22 so that the gear is free to be rotated by movement of the rack 88. The movement of the arm 310 (Fig. 18) causes the rack 424, by which the position of the crank pin 208 is adjusted, to be locked at this time so that the pin 422, carried by the outer end of the rack, will be in position for engagement with the slot 420 in the crank pin slide at the conclusion of the fuse-setting operation even though the motor, by which the rack 424 is adjusted, may be operated during the fuse-setting operation.

It will be understood that because of the variable speed drive of the shaft 162 (Fig. 7) the abovedescribed operations take place before this shaft starts to operate. Immediately after these operations have taken place the shaft 162 starts to turn causing rotation of the disk 164 and operation of the rack 88 (Figs. 14 and 40) to turn the fuse setter head in a direction to set the fuse of the round during the first 180° of movement of the shaft 162, the extent to which the fuse is set depending upon the position of the crank pin relatively to the disk 164.

During this operation of the fuse setter head the clutch 340 (Fig. 1) is engaged by movement of the lever 346 which is driven from the track in the under side of the cam 242 thus starting rotation of the cam shaft 104. After the shaft 162 (Fig. 7) has completed a half revolution it comes momentarily to rest during which time the cam 100 (Fig. 39) on the cam shaft 104 causes movement of the arm 68 (Fig. 40) to withdraw the fuse setter head from engagement with the nose of the round. Subsequently thereto the round is transferred into position to be rammed into the gun by mechanism actuated from the shaft 104 and which forms no part of the present invention but is illustrated and described in the copending application referred to above. Also as described in that application, a new round is indexed into fuse-setting position. When the shaft 162 has completed a half revolution the cam shaft 184 (Fig. 1) has completed a whole revolution but by reason of the mechanism illustrated in Fig. 9 no motion is imparted to the bar 280 at this time so that the crank pin 208 is maintained locked to the disk 164.

During the transferring of the round into ramming position and movement of a new round into fuse-setting position the shaft 162 completes its movement returning the crank pin 208 into its original position and consequently returning the fuse-setter head and the rack, by which it is turned, also into their original positions. At the completion of these movements the cam shaft 104 causes movement of the arm 68 (Fig. 40) back to the position illustrated thereby moving the fuse setter head into engagement with the nose of the round which has moved into fuse-setting position. This movement takes place at the completion of the rotation of the shaft 162

(Fig. 7) and just prior to movement of the member 404 (Fig. 34) into position to cause disengagement of the clutch 340. The cam 108 now causes movement of the segment 114 (Fig. 39) in a clockwise direction as indicated by the arrow thereby to rotate the support 46 through gears 66, 64 and 60 until one of the pawls 44 engages the notch 59 in the fuse ring of the round. The continued movement of the support causes the entire round to rotate until one of the pawls 34 in the carriage 20 is engaged by the notch 42 in the round, whereupon the round is properly engaged by the pawls in readiness for the next fuse-setting operation. This will happen before the segment 114 has completed its movement but no further movement of the support 46 takes place because of the fact that the gear 60 slips since the resistance to turning of the fuse ring with respect to the round is greater than the resistance afforded by the friction plates 62. The mechanism now comes to rest, it being understood that during the final movement of the shaft 162 the rocker frame 224 is returned to the position shown in Fig. 7 so that the crank pin 208 is free to be adjusted relatively to the crank disk and the other parts return to the positions illustrated. It should be understood that the entire operation, depending upon the speed of rotation of the shaft 138 (Fig. 7), takes place in a very short period of time, the entire fuse-setting operation, including the movement of a round into the gun and a new round into fuse-setting position and the movement of the fuse-setting mechanism into engagement therewith, taking place in one to two seconds. During this time the gun is also fired automatically as explained in the copending application referred to above.

Having thus described the invention, what I claim as new and desire to secure by Letters Patent of the United States is:

1. Fuse-setting mechanism comprising a carriage, a pawl supported by said carriage for engagement with a notch in a projectile, a support rotatable in said carriage, a pawl carried by said support engageable with a notch in the fuse ring of the projectile, means for turning said support including a slip connection arranged to yield under a light load, and other means for positively turning said support.

2. Fuse-setting mechanism comprising a carriage, a pawl supported by said carriage for engagement with a notch in a projectile, a support rotatable in said carriage, a pawl carried by said support engageable with a notch in the fuse ring of the projectile, means for turning said support including a slip connection arranged to yield under a light load, other mean for positively turning said support, and a one-way clutch connecting said last named means to said support.

3. Fuse-setting mechanism comprising a carriage, means mounting said carriage for rectilinear movement and constraining it against rotation, a pawl supported by said carriage for engagement with a notch in a projectile, a support rotatable in said carriage, a pawl carried by said support engageable with a notch in the fuse ring of the projectile, means for turning said support including a slip connection arranged to yield under a light load, means for positively turning said support, means for moving said carriage to engage said pawl with the projectile, and means for thereafter operating each of said turning means a predetermined amount in sequence.

4. Fuse-setting mechanism comprising a carriage, means mounting said carriage for rectilinear movement and constraining it against rotation, a pawl supported by said carriage for engagement with a notch in a projectile, a support rotatable in said carriage, a pawl carried by said support engageable with a notch in the fuse ring of the projectile, means for turning said support including a slip connection arranged to yield under a light load, means for positively turning said support, means for moving said carriage to engage said pawl with the projectile, means for thereafter operating each of said turning means a predetermined amount in sequence, and means for locking said last named turning means during operation of the first named turning means.

5. Fuse-setting mechanism comprising a carriage, a pawl supported by said carriage for engagement with a notch in a projectile, a support rotatable in said carriage, a pawl carried by said support engageable with a notch in the fuse ring of the projectile, means for causing engagement of said pawls with the notches in the projectile comprising a friction drive means for said support arranged to slip under a light load, means for operating said drive means a predetermined amount, positive drive means for thereafter turning said support to set the fuse, and means controlling the extent of operation of said last named drive means.

6. Fuse-setting mechanism comprising a carriage, a pawl supported by said carriage for engagement with a notch in a projectile, a support rotatable in said carriage, a pawl carried by said support engageable with a notch in the fuse ring of the projectile, means for causing engagment of said pawls with the notches in the projectile comprising a friction drive means for said support arranged to slip under a light load, means for operating said drive means a predetermined amount, positive drive means for thereafter turning said support to set the fuse, a one-way clutch mechanism interposed between said last named drive means and the support, means locking said last named drive means during operation of the first named drive means, and means controlling the extent of operation of said last named drive means.

7. In a fuse-setting mechanism a fuse setter head comprising a ring arranged to surround a projectile, a pawl carried by said ring arranged for engagement with a notch in the projectile for locking the projectile against movement in the fuse-setting operation, a second ring rotatable with respect to the first ring and arranged coaxially therewith, a pawl carried by said second ring engageable with a notch in the fuse ring, means for turning said second ring until the pawl carried thereby engages the notch in the fuse ring thereby causing rotation of the projectile until the pawl in the first ring engages the notch in the projectile, and means for thereafter turning said second ring a predetermined amount.

8. In a fuse-setting mechanism a fuse setter head comprising a ring arranged to surround a projectile, a pawl carried by said ring arranged for engagement with a notch in the projectile for locking the projectile against movement in the fuse-setting operation, a second ring rotatable with respect to the first ring and arranged coaxially therewith, a pawl carried by said second ring engageable with a notch in the fuse ring, means for turning said second ring until the pawl carried thereby engages the notch in the fuse ring thereby causing rotation of the projectile until the pawl in the first ring engages the notch in the projectile, means for thereafter turning said second ring a predetermined amount, and means rendering said last named turning means inoperative during operation of the first named turning means.

9. In combination, a fuse setter head having elements arranged to lock a round against rotation and other elements engageable with the fuse ring of the round to turn it relatively to the round, a rotatable support carrying said last named elements, means for moving said head to carry said elements into and out of engagement with the nose of a round, means for turning said support relatively to the round to locate said last named elements properly with respect to the round and to locate said round properly with respect to said locking elements, and preadjusted mechanism for imparting a predetermined turning movement to said support to set the fuse at the conclusion of the operation of said turning means.

10. Fuse-setting mechanism comprising a ring-engaging member rotatable to set the fuse of a round, means for turning said member a predetermined amount comprising a shaft rotatable through a fixed angle, a crank operated by said shaft, means operatively connecting said crank to said ring-engaging member, and means for adjusting the throw of said crank to vary the angle through which said member is turned in the fuse-setting operation.

11. Fuse-setting mechanism comprising a fuse-ring-engaging member rotatable to set the fuse of a round, means for turning said member a predetermined amount comprising a shaft rotatable through a fixed angle, variable speed mechanism for turning said shaft through a complete revolution including means for bringing said shaft momentarily to rest after it has been turned a half revolution, a crank operated by said shaft, means operatively connecting said crank to said member, means for adjusting the throw of said crank to vary the angle through which said member is turned in the fuse-setting operation, and means operative during the rest period of said shaft after it has been turned 180° for moving said member out of engagement with the round.

12. Fuse-setting mechanism comprising a fuse-ring-engaging member rotatable to set the fuse of a round, means for turning said member a predetermined amount comprising a shaft rotatable through a fixed angle, a crank disk carried by said shaft, a crank pin carried by said disk for adjustment radially thereof, a splined shaft operatively connected to said fuse-ring-engaging member, a rack engageable with said shaft, means connecting said rack to said crank pin including an adjustable link, means for adjusting the position of said crank pin radially of said disk thereby to vary the amount of rotation of the splined shaft during rotation of the first named shaft, and means for rotating said first named shaft through said fixed angle to set the fuse of the round.

13. Fuse-setting mechanism comprising a fuse-ring-engaging member rotatable to set the fuse of a round, means for turning said member a predetermined amount comprising a shaft rotatable through a fixed angle, a crank disk carried by said shaft, a crank pin carried by said disk for adjustment radially thereof, a splined shaft operatively connected to said fuse-ring-engaging member, a rack engageable with said shaft, means connecting said rack to said crank pin including an adjustable link, means for adjusting the position of said crank pin radially of said disk thereby to vary the amount of rotation of the splined shaft during rotation of the first named shaft, means for rotating said first named shaft through said fixed angle to set the fuse of the round, means for locking said splined shaft against rotation during the adjustment of the crank pin, and means for locking said crank pin to said disk and to said rack prior to unlocking of the splined shaft.

14. Fuse-setting mechanism comprising a ring-engaging member rotatable to set the fuse of a round, means for turning said member a predetermined amount comprising a shaft rotatable through a fixed angle, a crank disk carried by said shaft, a crank pin adjustably carried by said disk means operatively connecting said crank pin to said ring-engaging member, means for adjusting said crank pin on said disk, said last named means comprising a self-synchronous motor, and means for locking said crank pin on said disk prior to the fuse-setting operation.

15. Fuse-setting mechanism comprising a rotatable fuse-ring-engaging member, a drive shaft, a crank disk carried thereby, a slide carried by said disk for radial movement relatively thereto, a crank pin carried by said slide, a rack connected to said crank pin, a pinion arranged for engagement by said rack and connected to said fuse-ring-engaging member whereby said member is turned in response to rotation of said drive shaft, means for adjusting said slide relatively to said disk to adjust the throw of said crank pin and the extent of movement of said fuse-ring-engaging member, a drive motor, means connecting said motor to said drive shaft for a predetermined rotation of the latter, and means operative in response to operation of said connecting means for locking said slide in adjusted position on said disk.

16. Fuse-setting mechanism comprising a rotatable fuse-ring-engaging member, a drive shaft, a crank disk carried thereby, a slide carried by said disk for radial movement relatively thereto, a crank pin carried by said slide, a pinion operatively connected to said fuse-ring-engaging member, a rack engageable with said pinion, a pair of telescopically arranged links connecting said pin and said rack, means for adjusting said slide relatively to said disk, a drive motor, means connecting said motor to said drive shaft to rotate the latter through a predetermined angle, and means operative in response to operation of said connecting means for locking said slide to said disk and for locking said telescopic links together.

17. Fuse-setting mechanism comprising a rotatable fuse-ring-engaging member, a drive shaft, a crank disk carried thereby, a slide carried by said disk for radial movement relatively thereto, a crank pin carried by said slide, a self-synchronous motor connected to said slide when said drive shaft is at rest for varying the position of the slide relatively to the crank disk in accordance with the desired amount of fuse setting, means connecting said crank pin to said fuse-ring-engaging member, a drive motor, means for connecting said motor to said drive shaft to rotate the shaft through a predetermined angle, and means operative in response to operation of said connecting means for rendering said self-synchronous motor ineffective to vary the position of said slide and for locking the slide in adjusted position on the crank disk.

18. In combination, a drive shaft, a crank disk carried thereby, a slide carried by said disk for radial movement relatively thereto, a crank pin carried by said slide, a driven member operated by said crank pin, means for adjusting said slide on said disk to vary the throw of said crank pin, a drive motor, means for connecting said shaft to said motor for rotation thereby, and means operative in response to operation of said connecting means for locking said slide in adjusted position on said disk.

19. In combination, a drive shaft, a crank disk carried thereby, a slide carried by said disk for radial movement relatively thereto, a crank pin carried by said slide, a driven member operated by said crank pin, means for adjusting said slide on said disk to vary the throw of said crank pin, a drive motor, means for connecting said shaft to said motor for rotation thereby, means operative in response to operation of said connecting means for locking said slide in adjusted position on said disk, and means rendering said slide-adjusting means ineffective during operation of said drive shaft.

20. In combination, a drive shaft, a crank disk carried thereby, a slide carried by said disk for radial movement relatively thereto, a crank pin carried by said slide, a driven member operated by said crank pin, adjustable means connecting said crank pin and said driven member whereby adjustment of said crank pin relatively to said disk may be effected without movement of the driven member, means for adjusting said slide on said disk to vary the throw of said crank pin, a drive motor, means for connecting said shaft to said motor for rotation thereby, and means operative in response to operation of said connecting means for locking said slide in adjusted position on said disk and for locking said crank pin relatively to said drive member.

21. In combination, a drive shaft, a crank disk carried thereby, a slide carried by said disk for radial movement relatively thereto, a crank pin carried by said slide, a driven member operated by said crank pin, a pair of telescopic links connecting said crank pin and said driven member whereby adjustment of the crank pin relatively to the disk may be effected without movement of the driven member, means for adjusting said slide on said disk to vary the throw of said crank pin, means for locking said driven member in initial position when said drive shaft is at rest, a drive motor, means for connecting said shaft to said motor for rotation thereby, and means operative in response to operation of said connecting means for locking said slide in adjusted position on said disk, for locking said telescopic links together, and for releasing the means for locking the driven member in its initial position.

22. In combination, a hollow drive shaft, a crank disk carried thereby, a slide carried by said disk for radial movement relatively thereto, a crank pin carried by said slide, a driven member operated by said crank pin, means for adjusting said slide on said disk to vary the throw of said crank pin, a drive motor, means for connecting said shaft to said motor for rotation thereby, means in said shaft for locking said slide in adjusted position on said disk, and means for moving said locking means into locking position in response to operation of said connecting means.

23. Fuse-setting mechanism comprising a head mounted for rectilinear movement, said head including a fuse-ring-engaging member mounted for rotation to set the fuse of a round, a drive shaft, means connecting said drive shaft to said member to turn the member through a predetermined angle in the fuse-setting operation, a pinion carried by said shaft, a ring gear concentric with said pinion, planetary gearing connecting said ring gear and pinion, means for rotating said ring gear at a constant speed, means driven by said ring gear for oscillating the planetary gearing thereby to impart a variable speed motion to said drive shaft, and mechanism controlled by said ring gear for imparting rectilinear movement to said head during a period of rest of the drive shaft.

24. Fuse-setting mechanism comprising a head mounted for rectilinear movement, said head including a fuse-ring-engaging member mounted for rotation to set the fuse of a round, a drive shaft, means connecting said drive shaft to said member to turn the member through a predetermined angle in the fuse-setting operation, a pinion carried by said shaft, a ring gear concentric therewith, a planetary gearing connecting said ring gear and pinion, means for rotating said ring gear at a constant speed, means driven by the ring gear for oscillating the planetary gearing, the ratio of the gearing being such that the shaft comes momentarily to rest after one-half revolution thereof, and mechanism controlled by said ring gear for imparting rectilinear movement to said head to withdraw it from engagement with the nose of a round during said period of rest.

25. Fuse-setting mechanism comprising a fuse setter head mounted for movement toward and away from a round, said head including a fuse-ring-engaging member mounted for rotation to set the fuse of the round, a drive shaft, a crank disk carried thereby, a crank pin carried by said disk for radial adjustment thereon, means connecting said crank pin to said fuse-ring-engaging member to turn the member through a predetermined angle during rotation of the shaft, a pinion carried by said shaft, a ring gear concentric therewith, planetary gearing connecting said ring gear and pinion, means for rotating said ring gear at a constant speed, means driven by said ring gear for oscillating the planetary gearing thereby to impart a variable speed drive to said shaft, and means operated by said ring gear for locking the crank pin in adjusted position on the crank disk.

26. Fuse-setting mechanism comprising a head mounted for rectilinear movement, said head including a fuse-ring-engaging member mounted for rotation to set the fuse of a round, a drive shaft, means connecting said drive shaft to said member to turn the member through a predetermined angle in the fuse-setting operation, a pinion carried by said shaft, a ring gear concentric with said pinion, planetary gearing connecting said ring gear and pinion, a cam shaft, means connecting said ring gear and said cam shaft for simultaneous rotation, an eccentric carried by said cam shaft, means connecting said eccentric and said planetary gearing to oscillate the latter thereby imparting a variable speed drive to the drive shaft, the arrangement being such that the drive shaft comes momentarily to rest after it has completed one-half revolution, and means controlled by said cam shaft for causing rectilinear movement of the fuse setter head to move it out of engagement with the nose of a round during said period of rest.

27. Fuse-setting mechanism comprising a head mounted for rectilinear movement, said head including a fuse-ring-engaging member mounted for rotation to set the fuse of a round, a drive shaft, a crank disk carried by said drive shaft, a crank pin adjustable radially of the crank disk and carried thereby, means connecting said crank pin to the fuse-ring-engaging member to turn the latter in response to rotation of the drive shaft, the extent of the turning movement of said member depending upon the adjustment of the crank pin, a pinion carried by said shaft, a ring gear concentric therewith, planetary gearing connecting said ring gear and pinion, means for rotating said ring gear at a constant speed, a cam shaft driven by said ring gear, an eccentric carried by said cam shaft, means operated by said eccentric for oscillating said planetary gearing thereby to cause rotation of the drive shaft at a variable speed, the arrangement being such that the drive shaft momentarily comes to rest at the completion of one-half revolution, a cam carried by said cam shaft, means operated by said cam for locking the crank pin to the crank disk at the start of a fuse-setting operation, and means controlled by said cam shaft for moving said head rectilinearly during said momentary rest period of the drive shaft.

28. Fuse-setting mechanism comprising a rotatable fuse-setting ring, means for turning said fuse-setting ring, an adjustable member for varying the extent of movement of said ring, means for adjusting said member comprising a self-synchronous motor, reduction gearing connecting said motor directly to said member, means arranged to adjust said member independently of said self-synchronous motor, and means for operating said last named means automatically to establish the proper phase relationship of said member whenever it is out of phase with a transmitter for said self-synchronous motor.

29. Fuse-setting mechanism comprising a rotatable fuse-setting ring, means for turning said fuse-setting ring, an adjustable member for varying the extent of movement of said ring, means for adjusting said member comprising a self-synchronous motor, reduction gearing connecting said motor directly to said member, means arranged to adjust said member independently of said self-synchronous motor, means for operating said last named means automatically to establish the proper phase relationship of said member whenever it is out of phase with a transmitter for said self-synchronous motor, said adjusting means including an electric motor, and means operative upon its energization for connecting it to said member.

30. Fuse-setting mechanism comprising a rotatable fuse-setting ring, means for turning said fuse-setting ring, an adjustable member for varying the extent of movement of said ring, means for adjusting said member comprising a self-synchronous motor, reduction gearing connecting said motor directly to said member, means arranged to adjust said member independently of said self-synchronous motor, means for operating said last named means automatically to establish the proper phase relationship of said member whenever it is out of phase with a transmitter for said self-synchronous motor, said adjusting means including an electric motor, means for energizing said motor whenever said member is out of the proper phase relationship with the transmitter, and means for reversing the direction of rotation of said motor in the event it is initially rotated in the wrong direction.

31. Fuse-setting mechanism comprising a rotatable fuse-setting ring, means for turning said ring, an adjustable member for varying the extent of movement of said ring, means for adjusting said member comprising a self-synchronous motor, reduction gearing connecting said motor directly to said member, a second self-synchronous motor, said motors being arranged to be electrically connected to a pair of self-synchronous transmitting motors geared together, and means operated by said second self-synchronous motor for adjusting said member independently of the first self-synchronous motor automatically to establish the proper phase relationship of said member with the transmitting motors whenever it is out of the proper phase relationship therewith.

32. Fuse-setting mechanism comprising a rotatable fuse-setting ring, means for turning said ring, an adjustable member for varying the extent of movement of said ring, means for adjusting said member comprising a self-synchronous motor, reduction gearing connecting said motor directly to said member, a second self-synchronous motor, said motors being arranged to be electrically connected to a pair of self-synchronous transmitting motors geared together, means operated by said second self-synchronous motor for adjusting said member independently of the first self-synchronous motor automatically to establish the proper phase relationship of said member with the transmitting motors whenever it is out of the proper phase relationship therewith, said last named means including an electric motor, and means operated by said second self-synchronous motor for energizing said electric motor automatically in response to said member occupying a position which is not in the correct phase relationship with respect to the transmitting motors.

33. Fuse-setting mechanism comprising a rotatable fuse-setting ring, means for turning said ring, an adjustable member for varying the extent of movement of said ring, means for adjusting said member comprising a self-synchronous motor, reduction gearing connecting said motor directly to said member, a second self-synchronous motor, said motors being arranged to be electrically connected to a pair of self-synchronous transmitting motors geared together, means operated by said second self-synchronous motor for adjusting said member independently of the first self-synchronous motor automatically to establish the proper phase relationship of said member with the transmitting motors whenever it is out of the proper phase relationship therewith, said last named means including an electric motor, means operated by said second self-synchronous motor for energizing said electric motor automatically in response to said member occupying a position which is not in the correct phase relationship with respect to the transmitting motors, and means for automatically reversing said electric motor in response to movement of said member into a predetermined position indicative of its movement in the wrong direction.

References Cited in the file of this patent

UNITED STATES PATENTS

| | | |
|---|---|---|
| 1,635,365 | Karnes | July 12, 1927 |
| 1,640,392 | Beatty | Aug. 30, 1927 |
| 1,803,775 | Schuler et al. | May 5, 1931 |
| 1,898,081 | Dabrosky | Feb. 21, 1933 |
| 2,002,056 | Gietmann | May 21, 1933 |
| 2,039,848 | Howland-Shearman | May 5, 1936 |
| 2,241,378 | Evans | May 13, 1941 |
| 2,257,854 | Peterson | Oct. 7, 1941 |